(12) United States Patent
Giles et al.

(10) Patent No.: US 7,445,404 B2
(45) Date of Patent: Nov. 4, 2008

(54) REMOTE BOLTED FLANGE CONNECTION APPARATUS AND METHODS OF OPERATION THEREOF

(75) Inventors: John J. Giles, East Blairdaff (GB); Michael Camping, Bucksburn (GB); Graham Wishart, Bucksburn (GB)

(73) Assignee: Acergy UK Limited, Bucksburn, Aberdeen (GB)

( * ) Notice: Subject to any disclaimer, the term of this patent is extended or adjusted under 35 U.S.C. 154(b) by 0 days.

(21) Appl. No.: 10/494,698

(22) PCT Filed: Nov. 6, 2001
(Under 37 CFR 1.47)

(86) PCT No.: PCT/GB01/04913

§ 371 (c)(1),
(2), (4) Date: Feb. 22, 2005

(87) PCT Pub. No.: WO03/040602

PCT Pub. Date: May 15, 2003

(65) Prior Publication Data
US 2005/0141967 A1 Jun. 30, 2005

(51) Int. Cl.
*F16L 1/00* (2006.01)
(52) U.S. Cl. ...................... 405/169; 405/170
(58) Field of Classification Search ............... 405/169, 405/170
See application file for complete search history.

(56) References Cited

U.S. PATENT DOCUMENTS

| | | | |
|---|---|---|---|
| 2,752,056 A | 6/1956 | Lull | |
| 3,267,682 A | 8/1966 | Robley | |
| 3,984,009 A | 10/1976 | Holroyd | |
| 4,030,309 A | 6/1977 | Mason | |
| 4,674,915 A | 6/1987 | Shatto, Jr. | |

(Continued)

FOREIGN PATENT DOCUMENTS

EP  0 544 102 A1  6/1993

(Continued)

OTHER PUBLICATIONS

Corbetta; "'As Divers do' a New and Cost Effective Approach to Remote Tie-in Operations"; Offshore Technology Conference, Aberdeen, UK, 1999.

(Continued)

*Primary Examiner*—Sunil Singh
(74) *Attorney, Agent, or Firm*—Sheridan Ross P.C.

(57) ABSTRACT

A single-module deployable bolted flange connection apparatus (10) makes up standard flange joints (24, 32) for various pipeline tie-in situations, such as spool piece connection and flowline-tree connections, without the use of divers and auxiliary multiple pieces of equipment. An outer Flange Alignment Frame (FAF) (14), carries one or more claws (38) for grabbing the pipe/spool to provide flange alignment. The claws are suspended and driven by a novel arrangement of five hydraulic rams (412-420) A crash-resistant inner frame (148) houses complete connection tooling (150, 152 etc.) The tooling performs the final alignment steps, inserts the gasket and studs, applies the required tension, and connects the nuts. Studs and nuts are stored separately from the tooling in an indexed carousel, to permit multiple operations, reverse operations (disconnection), and re-work of failed steps, all without external intervention.

45 Claims, 15 Drawing Sheets

U.S. PATENT DOCUMENTS

| | | | |
|---|---|---|---|
| 6,234,717 B1 | 5/2001 | Corbetta | |
| 6,439,807 B1 * | 8/2002 | Wijsman | 405/170 |
| 6,742,963 B2 * | 6/2004 | Bekkevold et al. | 405/170 |
| 6,767,165 B1 * | 7/2004 | Corbetta | 405/170 |
| 2001/0010782 A1 * | 8/2001 | Corbetta | 405/170 |

FOREIGN PATENT DOCUMENTS

| | | | |
|---|---|---|---|
| FR | 2 679 694 | | 1/1993 |
| GB | 1 278 112 | | 6/1972 |
| GB | 2 324 489 | | 10/1998 |
| WO | 0266236 | * | 5/1988 |
| WO | WO 97/15773 | | 5/1997 |

OTHER PUBLICATIONS

Frazer et al.; "The Development of a Remote Repair System for Deep Water Pipelines"; Brazilian Petroleum Institute—IBP; 2000 pp. 1-8.

West et al.; "Diverless subsea flange connection"; Journal of Offshore Technology; Feb. 1999; vol. 7, No. 1; pp. 2-5.

West et al.; "Development of a Diverless System for the Connection of Subsea Flanges"; Session 13 Paper 1, Deep Offshore Technology—10$^{th}$ Int'l. Conference, New Orleans, Louisiana Nov. 17-19, 1998; 10 pages.

Frazer et al.; "The Repair of Pipelines and Flowlines in Deep and Ultra Deep Water"; Deep Offshore Technology 2000; 9 pages.

West et al.; "A Pipeline Tie-In System for the Diverless Connection of Bolted Flanges"; Offshore South East Asia 1998; 8 pages.

Corbetta; "BRUTUS: The Rigid Spoolpiece Installation System"; Offshore Technology Conference 1999; 7 pages.

Frazer et al; "Improving the Economics of Deep Water Tie-Backs Through the Use of Low Cost Pipeline Connectors"; Subsea 2000 International Conference; Nov. 28-29, 2000; 10 pages.

* cited by examiner

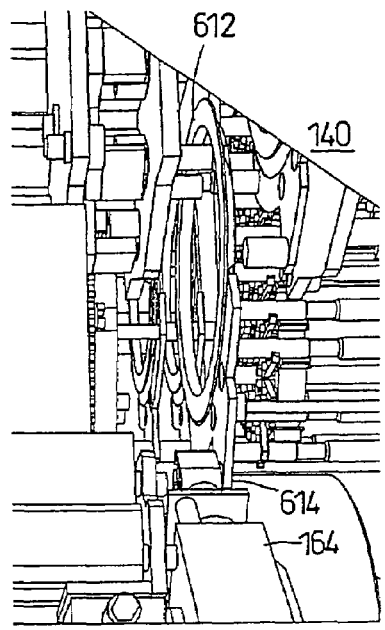 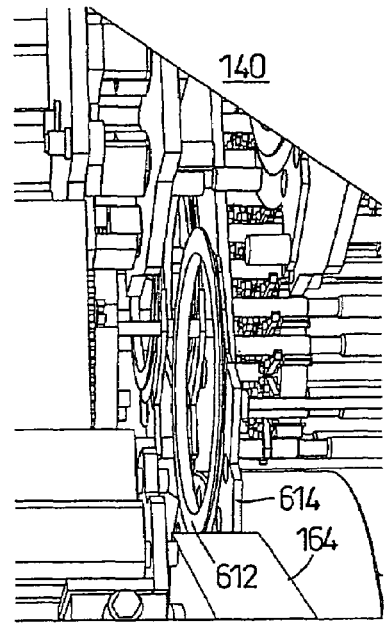
*Fig. 9A*  *Fig. 9B*
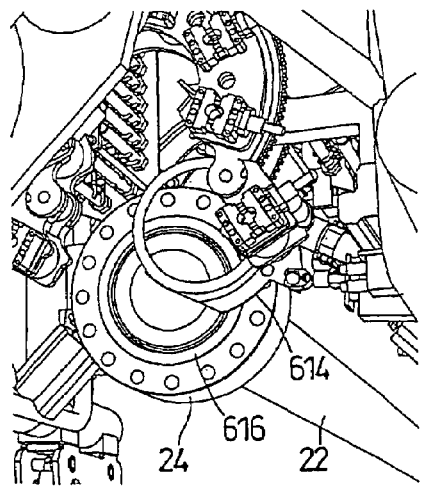 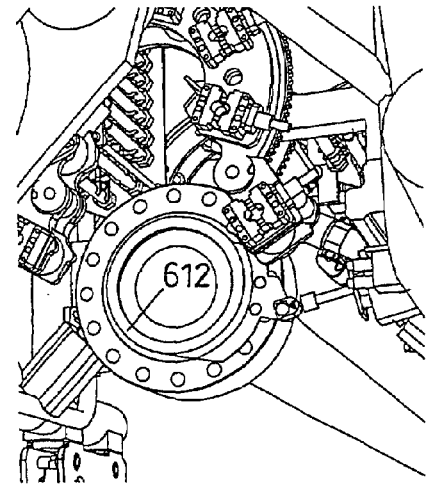
*Fig. 9C*  *Fig. 9D*

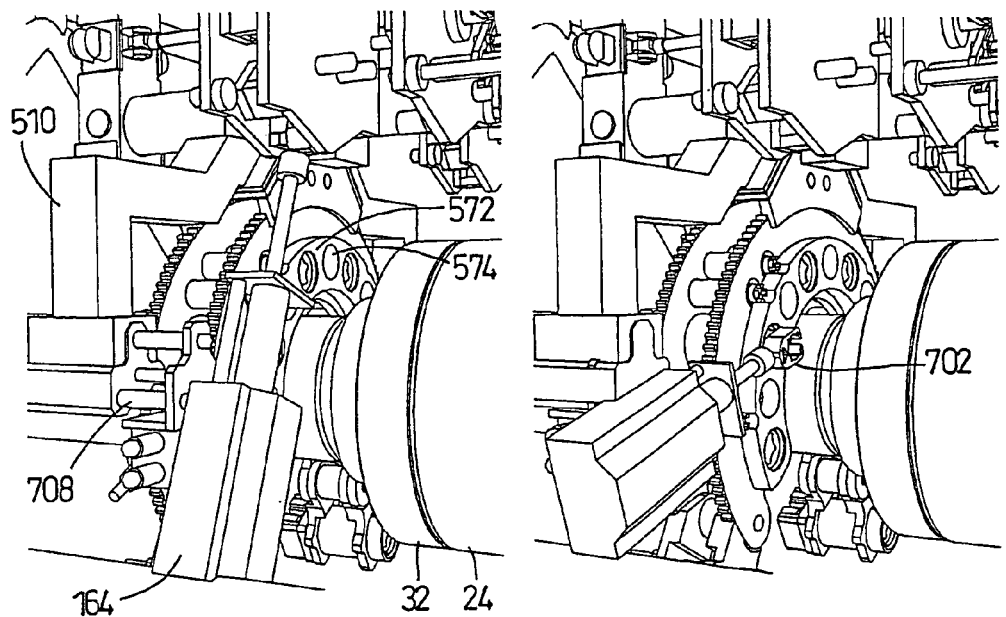
*Fig. 11A*     *Fig. 11B*
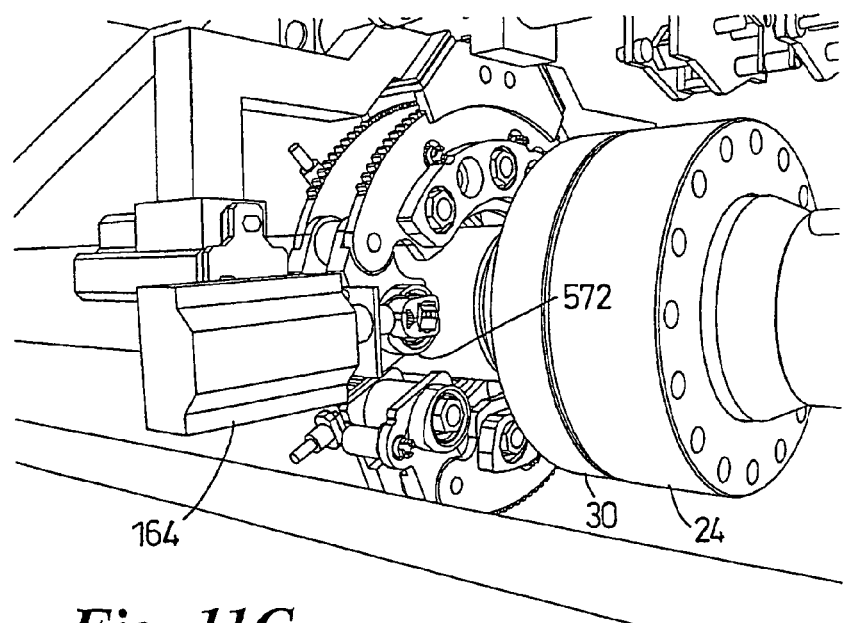
*Fig. 11C*

REMOTE BOLTED FLANGE CONNECTION APPARATUS AND METHODS OF OPERATION THEREOF

FIELD OF THE INVENTION

The present invention relates to a bolted flange connection apparatus and method. More specifically, it concerns an apparatus and method for the remote connection, and optionally disconnection, of the flanges of a sub-sea pipeline in a deepwater environment.

BACKGROUND OF THE INVENTION

Bolted flanges are by far the most widely used and cost effective method of connecting sub-sea pipelines in the oil and gas industry today. The widespread use of this method is largely due to the long-term performance and reliability of sub-sea flanges during the lifetime of the pipeline. Additionally, the level of confidence that pipeline operators have in the integrity of such a connection adds to its universal acceptance as the most appropriate method for connecting pipelines.

Since the inception of this method of connection, the installation of bolted flanges in sub-sea environments has been performed manually by divers. In use, the application of this method is restricted because of the limited depth in which the diver can safely operate. Accordingly, the use of this important connection method has to date been precluded from deepwater applications which extend beyond those depths where it is safe for divers to operate. Rather more elaborate (and expensive) joint types have been developed for diver-less applications. These lack the widespread acceptance of the simple bolted flange.

Technology to enable the installation and use of sub-sea bolted flange connections without divers has therefore been pursued for deepwater applications. This has been done with the aim of using rigid flanged spools, which are the preferred tie-in method for shallower waters, in deepwater applications beyond diver depths. Known systems were designed to make up standard ANSI and API flange joints, for various pipeline tie-in situations, such as spool piece connections and flowline-tree connections. This provided the opportunity of utilising proven technology from shallow water into deepwater applications.

Prior systems for remote bolted flange connection are described in A PIPELINE TIE-IN SYSTEM FOR THE DIVERLESS CONNECTION OF BOLTED FLANGES by Alan West, David Gibson and Ian Frazer, OFFSHORE SOUTH EAST ASIA 1998 and in U.S. Pat. No. 6,234,717 (Corbetta). The paper by West et al describes a system marketed as MATIS by the present applicant, from which the novel system described herein has been developed (MATIS is a registered trade mark). These known systems generally require the deployment of several separate modules for aligning the pipework, and/or for different stages of operation, such as flange alignment, gasket insertion and so forth. The cost of deploying such systems is therefore still quite great, especially as depths increase.

The known remote bolted flange connection system mentioned above generally supplies the flange bolting consumables, such as nuts and bolts (studs), pre-arranged in a manner to suit the pitch circle diameter of the particular flange configuration ready for insertion into the flanges. With the consumables set out in this flange pattern, complications arise when there is a fault with any of the nuts or bolts as the tooling cannot replace failed individual bolts or nuts in order to complete the connection. This problem would not only seriously delay the completion of the connection but would add great expense to the process. Damage to a gasket likewise may render the joint useless.

To solve the problems encountered by the prior art, the question to be resolved is how to achieve completion of the flange connection remotely in deepwater environments when one or more of the consumables have failed or need rectified.

Submersible vehicles can be used for this type of operation but they have the disadvantage of being extremely costly to maintain in operation and the skilled manpower needed to operate them. Additionally, these vehicles are somewhat cumbersome for such an intricate and precise operation and their ability to access certain areas is limited due to their size and shape.

SUMMARY OF THE INVENTION

One object of the present invention, which has several independent aspects, is to provide a more versatile remote bolted flange connection apparatus and method. Other objects are to overcome one or more of the various disadvantages of known systems, as set forth above.

In accordance with a first aspect of the invention, there is provided a remotely controlled apparatus for use in forming a bolted connection between first and second flanges to connect the ends of respective first and second conduits in a subsea installation, each flange having a front face for meeting the other flange, a rear face and a set of holes at predetermined positions on a pitch circle, the apparatus comprising:

a stud loading tool for handling a set of bolts corresponding in number to the holes in the flanges and arranged to approach from the rear of the first flange to insert a free end of each bolt so as to project through aligned holes in the first and second flanges; and a nut running tool including at least one rotatable socket for holding at a nut behind the second flange to receive one of the projecting stud ends and for running the nut onto a threaded portion of the stud end, wherein said stud loading tool comprises:

at least one stud insertion actuator, adapted for gripping, inserting and releasing studs one at a time and supported so as to be movable to any of a plurality of hole positions within at least a segment of said pitch circle, and wherein the apparatus further comprises:

stud storage means separate from the stud insertion actuator(s) for storing sufficient studs for the holes within said segment and operable to present the studs for removal one at a time; and stud transfer actuator for removing a stud from the stud storage means and transferring it to the stud insertion actuator for insertion at a desired hole position within said segment.

Separating the insertion tool from the magazine permits a more economic design, with fewer insertion actuators. It further permits more flexible sequencing of operations, such as to permit re-work or reversal of the connection operations to facilitate disconnection and repair.

In a preferred embodiment, the stud transfer actuator comprises a gripping device mounted on a pick-and-place arm providing at least two translational degrees of freedom and operable to grip and remove a stud presented by the stud storage means.

In the embodiment disclosed, the insertion actuator is one of a set of (for example, two) insertion actuators, each associated with hole positions within a respective segment of the pitch circle, the set of such segments covering the complete circle.

In the embodiment, the insertion actuators are carried on a common part-circular yoke open at one side to admit the first conduit and mounted in a part-circular bearing so as to be rotatable around the conduit through an angle at least equal to 360° divided by the number of insertion actuators. The common yoke carries at least one camera for remote viewing of the flange connection in a radial direction. At least one of the stud insertion tool and the nut running tool may further carry at least one camera for remote viewing in an axial direction through the flange holes to confirm alignment and orientation of the first and second flanges.

In the preferred embodiment, the stud storage means comprises two separate magazines and separate stud transfer actuator is provided for each of two stud insertion actuators.

Said stud storage means may be designed to hold more studs than are nominally required for completion of the flange connection. The magazines between them can contain more than enough studs for two connections, still with redundancy. Further fault tolerance may be provided, if consumables from either magazine can be fed to any of the hole positions.

In the embodiment, said stud insertion tool is operable to engage a hole on the first flange using either a stud or equivalent body and, by rotating itself around the conduit axis, to rotate the first flange, thereby to align the holes in the first and second flanges. This avoids the need to deploy flange alignment tool and connection tooling sequentially, as in the original MATIS™ system.

To reduce the complexity of deployment, said stud loading tool may be carried on a first sub-frame while said nut running tool is carried on a second sub-frame, both sub-frames in turn being carried on a common frame for deployment as a single unit. Said common frame may comprise an inner frame and an outer frame, the stud insertion tool, nut running tool, stud storage means and (where provided) nut storage means and gasket storage means together being carried on the inner frame, the inner frame being separable from the outer frame, the outer frame comprising means for coupling the apparatus to support means at the worksite. The inner frame may be used with various different outer frames, to suit different applications. The inner frame may also provide additional protection and recoverability of the expensive tooling, in the event of accidents.

The common frame, especially the outer frame part, may further carry one or two alignment claws operable to grip and manoeuvre one or both of said conduits into alignment with the other and with an axis of the stud loading tool. This further reduces the number of units to be deployed to the seabed, compared for example with US U.S. Pat. No. 6,234,717 mentioned above.

In accordance with another aspect of the invention, set out in more detail below, the alignment claw may comprise an openable elongate collar having forward and rear ends, said collar being suspended beneath part of said common frame by an arrangement of five independently controllable rams.

Said first and second sub-frames may be mounted on a common sub-frame so as to be movable in unison relative to said common frame in a direction transverse to said conduits, and to be movable independently of one another relative to the common sub-frame, in a direction parallel to the conduits.

The stud storage means comprises a magazine carried on said common frame independently of said first sub-frame.

Buoyancy modules may be attached to the common frame so as to support substantially the entire mass of the apparatus in its operating environment. This permits deployment of the entire apparatus by a single ROV. Alternatively, the apparatus may have substantial weight and be lowered by wires.

In the preferred embodiment said nut running tool further comprises:
  nut storage means separate from the rotatable socket(s) for storing sufficient nuts for the holes within at least a segment of the pitch circle, and operable to present the nuts for removal one at a time; and
  at least one nut transfer actuator for removing a nut from the nut storage means and transferring it to one of said rotatable sockets for application to a stud at a desired hole position within said segment.

The same advantages of flexibility and reversibility flow in relation to the nuts as for the stud insertion tool and storage means. The nut transfer actuator may comprise a gripping device mounted on a pick-and-place arm providing at least two translational degrees of freedom and operable to grip a portion of a nut presented by the nut storage means, such that another portion of the nut may be engaged within said rotatable socket.

Whereas two stud insertion actuators is sufficient, the number of rotatable sockets is preferably at least four, such that tension can be applied to the connection simultaneously in all quadrants of the pitch circle. The number of rotatable sockets may be half the number of holes (50% nut runners) or may be equal to the number of holes (100%).

At least a majority of the rotatable sockets may be carried on a common part-circular yoke open at one side to admit the first conduit and mounted in a part-circular bearing so as to be rotatable around the conduit through an angle greater than 150°. This allows all sockets to be loaded by two nut transfer actuators.

A minority of the rotatable sockets may be mounted on one or more extensions of said common yoke, the extensions being pivotally connected to the common yoke and having a closed position placing the rotatable socket on said pitch circle and an open position for admitting the second conduit into the part-circular yoke.

According to yet another aspect of the invention, recited in more detail below, each of said rotatable sockets may be independently sprung against axial displacement and adapted to be driven at low torque so as to engage an array of nuts of unknown orientation.

Said stud storage means and said nut storage means may comprise a magazine having receptacles for storage of nuts and studs independently. Two such magazines may be provided, for redundancy of operation and/or for concurrent operation on two sides of the apparatus.

The apparatus may further comprise axial tensioning means for engaging at least a subset of said studs and tensioning the studs longitudinally to compress the flange connection and permit further running of the nut by said rotatable socket. Said axial tensioning means may comprise a collet and jack at the rear of each rotatable socket in the nut running tool.

In the Corbetta system mentioned above, by contrast, axial tensioning means is apparently performed at the same side as the stud insertion tooling, rather than at the side of the nut magazine. The invention is not limited to either type of arrangement.

The apparatus may further comprise gasket storage means. One of said stud transfer actuator(s) and said nut transfer actuator(s) (where provided) may be further operable to remove a gasket from the gasket storage means and to insert the gasket between the first and second flanges. This avoids the separate flange alignment/gasket insertion tool of the prior MATIS system mentioned above.

The gasket storage means may be operable to store more gaskets than are required for completion of said connection, either for performing plural connections or for redundancy in case of failure or damage of the gasket.

At least one of said stud transfer actuator and said nut transfer actuator may be further operable to remove a protective cover from the face of one said flanges prior to forming said connection.

The invention yet further provides a method of operating an apparatus according to the first aspect of the invention as set forth above, to make a new bolted flange connection near the seabed, the method further including reversing or repeating part of the connection process to accommodate random adverse events in the connection process.

The invention yet further provides a method of operating an apparatus according to the first aspect of the invention as set forth above to make a new bolted flange connection near the seabed, the method further including moving the apparatus and making a further bolted flange connection without re-stocking the storage means with studs or bolts.

Such methods may further comprise re-stocking the apparatus with studs and/or nuts without returning the stud insertion tool or the nut running tool to the surface. Extended operations can be conducted at great depths in this manner, supplying only re-stocked magazines to be exchanged for exhausted magazines, at the seabed.

The invention yet further provides a method of operating an apparatus according to the first aspect of the invention as set forth above to un-make a pre-existing bolted flange connection. The nuts can be removed and stored in the storage means, for example for decommissioning, replacement of gaskets and so forth.

In a second independent aspect, the invention provides a pipe handling apparatus comprising an openable elongate collar having forward and rear ends connected to a frame by an arrangement of five independently controllable rams spaced on the collar and the frame so as to manipulate the conduit with five principal degrees of freedom.

In a preferred embodiment, said five rams comprise:
a forward pair of rams arranged to act nominally in respective directions in a first plane transverse to the conduit axis,
a rearward pair of rams arranged to act nominally in respective directions in a second plane transverse to the conduit axis and displaced along said axis, and
a fifth ram arranged to act nominally in a plane parallel to the conduit axis.

The pairs of rams may be arranged in a V formation in each of said transverse planes, resulting in a compact arrangement, and one which does not interfere with access to the pipes. The angle of the V may be an acute angle at all states of the rams, tending towards a right angle in minimum extension. Where the bottom of the V provides a narrow baseline, some minimal control in the sixth rotational degree of freedom may be available, but without the force of the five principal degrees.

Each of said rams may be connected to the collar and the frame by means of universal joints so as to permit deviations from its nominal plane under the action of the other rams. Four of said rams may connect respective parts of the collar to four respective reaction points located in a common plane. The fifth ram may connect a point on said collar close to one end of the collar and a fifth reaction point on the frame vertically above the nominal position of the conduit axis, and close to or beyond the other end of the collar. The fifth reaction point may be located substantially in the same plane as the four reaction points.

In a further independent aspect, the invention provides a remotely operable nut running tool for use in making bolted flange connections, the tool comprising a plurality of rotatable sockets arranged in a circular array corresponding to at least a subset of bolt positions in said bolted flange connection, wherein a part of each of said rotatable sockets is independently sprung against axial displacement, the apparatus comprising means for advancing the array of sockets a first distance against an array of nuts, means for driving said sockets at low torque so as to engage each nut under the spring action.

According to this aspect, the is further provided a method of engaging an array of nuts using a remotely operable nut running tool as set forth in the preceding paragraph, the method comprising:
(a) advancing the nut running tool a first distance so as to engage each socket with a respective nut and, where the orientations of nut and socket are not matched, to displace the sprung part of the socket relative to the remainder of the socket;
(b) applying a low-torque rotary drive to the sockets until each socket has come into an orientation matched with its respective nut and sprung to enclose at least a part of the nut;
(c) applying a high torque rotary drive to the sockets to drive the nuts in a desired direction.

Step (b) may include detecting stalling of the sockets to determine completion of the step. Step (c) may include advancing the tool further onto said nuts before commencing said high torque drive.

The method can be applied to engage and loosen nuts in a bolted flange connection. The nut running tool may form also the nut running tool of an apparatus according to any embodiment of the first aspect of the invention, as set forth above.

The invention in a further independent aspect provides a remotely controlled apparatus for use in forming a bolted connection between first and second flanges to connect the ends of respective first and second conduits in a subsea installation, each flange having a front face for meeting the other flange, a rear face and a set of holes at predetermined positions on a pitch circle, the apparatus comprising:
a stud loading tool for handling a set of bolts corresponding in number to the holes in the flanges and arranged to approach from the rear of the first flange to insert a free end of each bolt so as to project through aligned holes in the first and second flanges; and
a nut running tool including at least one rotatable socket for holding at a nut behind the second flange to receive one of the projecting stud ends and for running the nut onto a threaded portion of the stud end, wherein said stud loading tool is carried on a first sub-frame and said nut running tool is carried on a second sub-frame, both sub-frames in turn being carried on a common frame for deployment as a single unit.

Said first and second sub-frames may be mounted on a common sub-frame so as to be movable in unison relative to a fixed part of said common frame in a direction transverse to said conduits, and be movable independently of one another relative to the common sub-frame, in a single direction generally parallel to the conduits.

Said first and second sub-frames and the stud insertion tool and the nut running tool may be mechanically connected only via said common sub-frame. Said first and second sub-frames are coupled to fixed points on said common sub-frame by respective rams aligned with said single direction.

Said common sub-frame may comprise a pair of longitudinal beams arranged parallel to the nominal axis of the conduits, each of said first and second sub-frames being coupled to said beams by a respective pair of linear bearings and thereby constrained to move only linearly relative to one another.

Said common frame may comprise an inner frame and an outer frame, the stud insertion tool and nut running tool together being carried on the inner frame, the inner frame being separable from the outer frame, the outer frame comprising means for coupling the apparatus to a supporting structure located at the worksite.

Said outer frame may further carry one or two alignment claws operable to grip and manoeuvre-one or both of said conduits into alignment with the other and with an axis of the stud loading tool.

The common frame may further carry removable storage magazines for storing studs and nuts for use by said tools separately from the tools themselves.

The apparatus may further comprise buoyancy modules attached to the common frame so as to support substantially the entire mass of the apparatus in its operating environment.

The outer frame may be one of a set of alternative outer frames appropriate to different conduit arrangements.

In a preferred embodiment, for example, one of said alternative outer frames includes flange alignment claws for both the first and second conduits, while another includes a flange alignment claw for one conduit only. The first of these may be made by fitting an extension to the second type of frame. One of said alternative outer frames may provide for coupling vertical conduits.

BRIEF DESCRIPTION OF THE DRAWINGS

Embodiments of the invention will now be described, by way of example only, by reference to the accompanying drawings, in which:

FIGS. 9A-9D illustrate the transfer of a gasket from the carousel to the space between the flanges;

FIGS. 11A-11C illustrate the transfer of nuts from the carousel to the Nut Running and Tensioning Tool using a further PAPA;

DETAILED DESCRIPTION OF THE EMBODIMENTS

The bolted flange connection system to be described has been designed to make up standard ANSI and API flange joints for various pipeline tie-in situations, such as spool piece connection and flowline-tree connections. This provides the opportunity of utilising proven technology from shallow water into deepwater applications, without the need for divers and with the benefits of reduced costs and lead times, and increased system reliability. The system has been developed from the MATIS™ System described in the paper by West et al, mentioned in the introduction.

FIG. 1 shows a diver-less flange connection apparatus 10 approaching a work site under control of a remotely operated vehicle (ROV) 12. The apparatus is carried entirely within frame 14, so as to have very little weight when submerged. ROV 12 and apparatus 10 receive power and control signals via an umbilical cable 18.

Figure 1A:
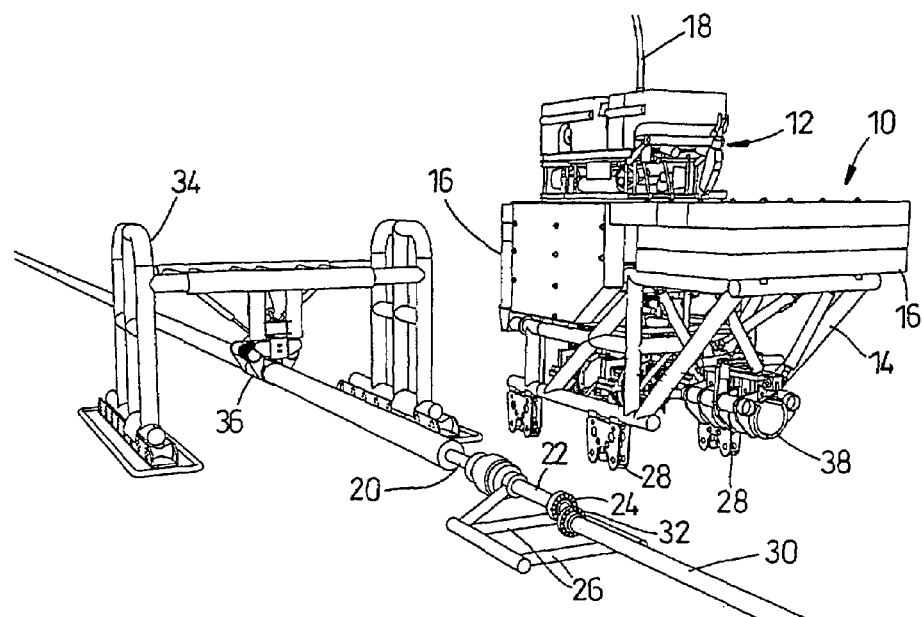
FIG. 1A illustrates a diver-less Flange Connection System, including an apparatus according to one embodiment of the present invention shown in the foreground approaching a work site where a pipeline repair is to be completed.

At the work site shown in FIG. 1A, a pipeline repair is to be completed. A broken pipeline has been fitted with a short adapter section 22 carrying a first flange 24. Adapter section 22 is supported by a structure which also provides docking bars 26 for alignment claws 28 of the apparatus 10. A second pipe or spool piece 30 is provided with a second flange 32, to be connected to flange 24 using the apparatus 10. This system optionally includes one or more separate pipe handling frames 34, which includes a movable claw 36 for preliminary positioning of the pipework.

Apparatus 10 further includes an alignment claw 38 for final alignment of pipe 30 with adapter section 22.

Each flange 24, 32 has a number of holes, in this example sixteen, arranged on a circle known as the pitch circle. First flange 24 is a swivel flange, meaning that it can be rotated relative to the fixed pipe section 22, to align the holes of the two flanges, irrespective of the angular orientation of flange 32.

Figure 1B:
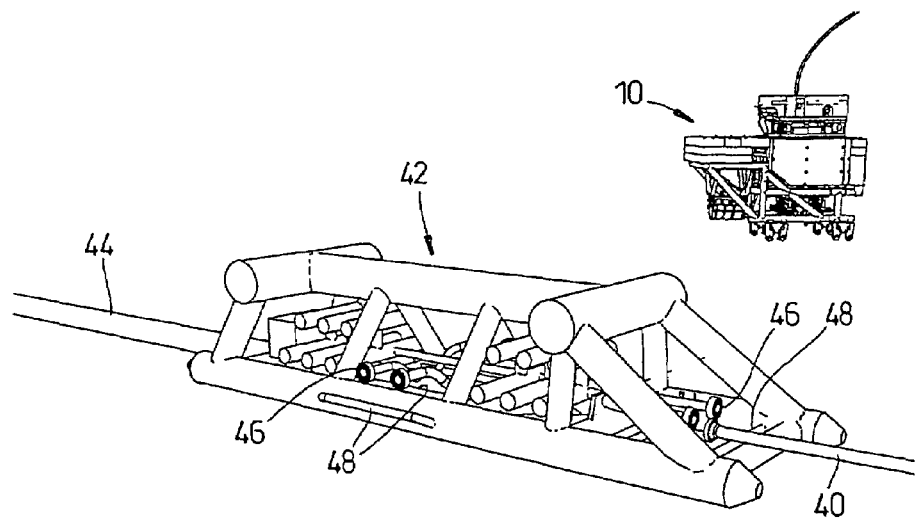
FIG. 1B shows the same apparatus in the background, approaching another work site, where a number of flow lines are to be connected to a subsea manifold.

FIG. 1B illustrates the same apparatus 10 approaching a different work site. Here a number of individual pipes 40 are to be connected to a production manifold 42, for the export of hydrocarbons from a number of wells via export pipeline 44. Swivel flanges 46 are provided for connection of pipes 40 from the individual wells. Docking bars 48 are included for docking of the apparatus 10.

Figure 2:
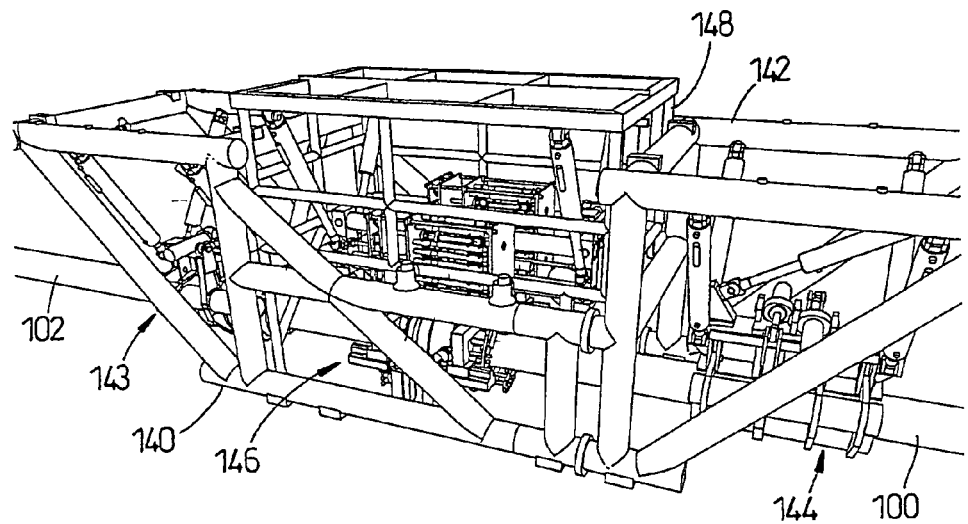
FIG. 2 shows in more detail the general arrangement of the apparatus, with buoyancy modules removed for clarity, and in a modified embodiment extended with an additional Alignment Claw.

FIG. 2 shows a modified embodiment of apparatus 10 in more detail, with the buoyancy modules 16 and ROV 12 removed, for clarity. The apparatus is shown making an in-line connection between a first pipe 100 and a second pipe 102. Respective flanges (seen better in later diagrams) are provided, with the first pipe 100 have the swivel flange. Outer frame 14 (FIG. 1) is shown in more detail at 140. This outer frame or flange alignment frame FAF is provided with first alignment claw 143 as in FIGS. 1A and 1B, but in FIG. 2 is also extended at 142, to include a further alignment claw 144. The alignment claws are of a type shown in more detail in FIG. 4, described below. As shown in FIG. 2, flange connection tooling 146 is carried within a separable inner frame 148. This will now be described in more detail with reference to FIG. 3.

Figure 3:
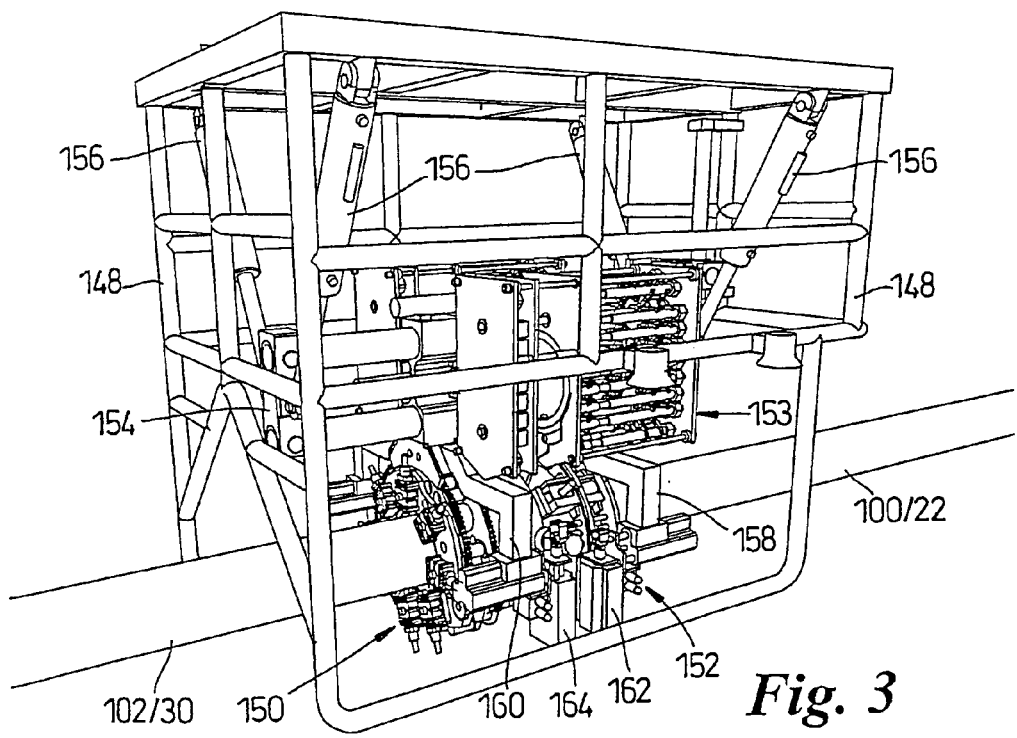
FIG. 3 shows an inner frame of the apparatus, carrying Flange Connection Tooling, with the outer frame removed for clarity.

FIG. 3 shows the flange connection tooling 150, 152, within a crash-resistant inner frame 148, with the flange alignment frame 140 removed for clarity. Within the inner frame 148, a Nut Running and Tensioning Tool 150 and Stud Loading/Unloading Tool 152 are carried. Frame 148 is adapted to straddle the pipelines 100 and 102, and the tooling can be raised or lowered to engage the pipeline for making a flange connection. To this end, tools 150 and 152 are carried by a common sub-frame in the form of a slider beam arrangement 154, to be described in more detail below with reference to FIG. 5. Four hydraulic rams are located at the ends of the slider beam arrangement 154, to raise and lower the tooling. The Stud Loading/Unloading Tool (SLUT) 152 and associated components are carried on a first carriage effectively forming a first sub-frame, an arm of which is visible at 158. Similarly, Nut Running and Tensioning Tools 150 is carried on the second carriage, forming a second sub-frame and extended as shown at 160.

Compared with prior arrangements, the single-module deployment provided by the flange alignment frame 140 and inner frame 148 containing all the necessary tooling to complete the flange connection, affords the far more economical solution, particularly in very deep water. At the same time, the separation of the inner frame 148 from the outer frame 140 permits the same tooling 150, 152 etc to be used with a variety of different flange alignment frames 140, or with none. The same tooling can even be used in vertical alignment, although it will be described using terminology appropriate to the horizontal pipe for the sake of simplicity.

Figure 4:
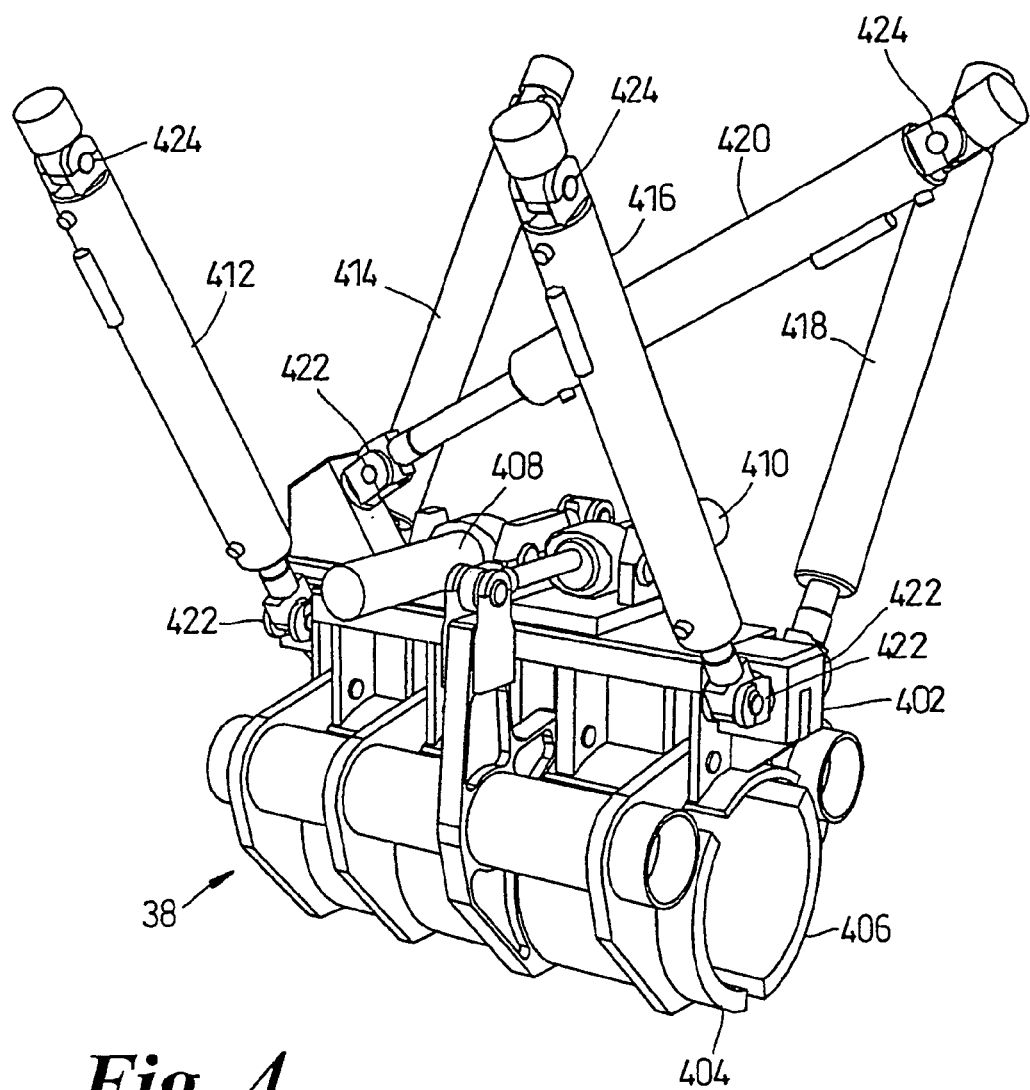
FIG. 4 shows in isolation one Alignment Claw of the apparatus of FIG. 2.

FIG. 4 shows an alignment claw in more detail, suitable for use as the claw 38, 143 or 144 in the earlier drawings. Alignment claw 400 provides a rigid pipeline clamp controllable with 5° of freedom (three translation, two rotation). A rigid clamp body 402 is provided with hinged jaws 404, 406 to form a closable cylinder of a size to match the diameter of the pipe being handled. Hydraulic rams 408, 410 provide opening and closing forces for the jaws 404, 406, to clamp the pipe tightly.

Four hydraulic rams 412 to 418 are arranged in two "V" configurations at opposite ends of the clamp body 402. Each "V" lies nominally in a plane perpendicular to the pipe axis, the two planes being separated in the axial direction. A fifth ram 420 extends in a plane parallel to the pipe axis, rising at an angle and extending substantially the full length of the clamp body 402. Each ram is connected to the clamp body 402 by an universal joint 422. Further joints 424 connect the upper end of each ram to precise location on the flange alignment frame 140 (not shown). The five rams 412-420 facilitate movement of the clamp body 402 with five principal degrees of freedom, three translational degrees, and two rotational (pitch and yaw). For example, the Alignment Claw (and therefore the pipeline) is moved bodily closer to the frame of the FAF by shortening all four rams. The pipeline is rotated (pitched) to an angle with respect to the frame by adjusting the front ram lengths to be different to the rear ram lengths. The Alignment Claw and pipeline are moved in a longitudinal direction with respect to the FAF, and therefore closer or further from the other flange, by using the fifth ram in combination with minor adjustment of the four corner rams.

Figure 5A:
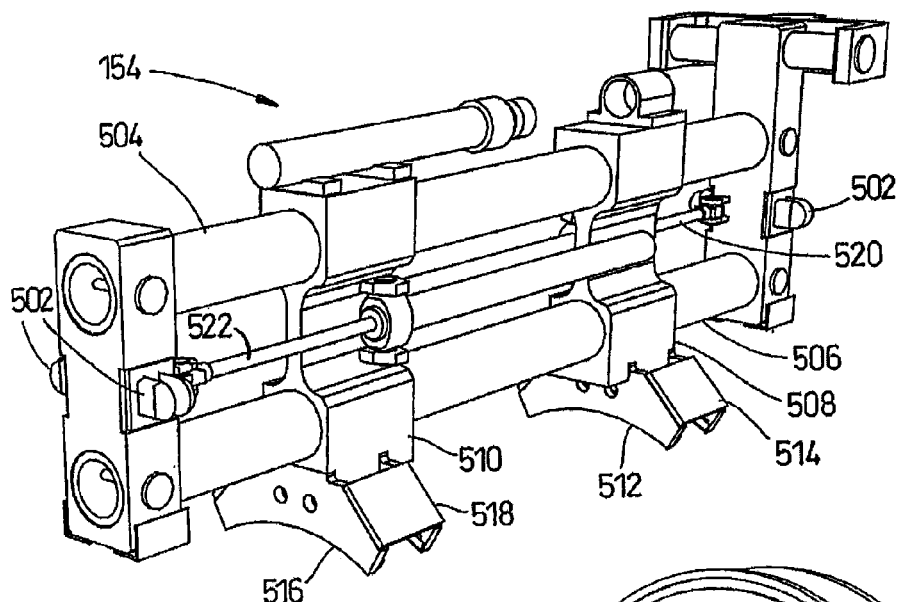
FIG. 5A is a perspective view of a Slider Beam that forms a common subframe for Flange Connection Tooling, a Stud Loading/Unloading Tool, and a Nut Running and Tensioning Tool.
Figure 5B:
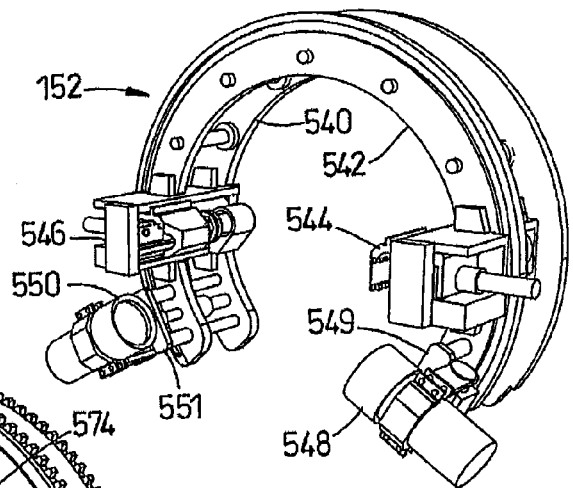
FIG. 5B is a perspective view of the Stud Loading/Unloading Tool detached from its arcuate bearing.
Figure 5C:
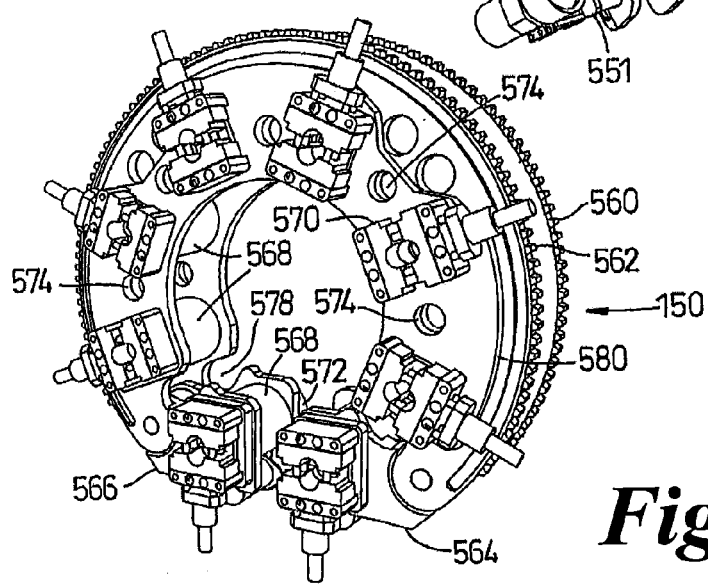
FIG. 5C is a perspective view of the Nut Running and Tensioning Tool detached from its bearing.

Each ram is provided with position encoders, and the rams are controlled together by computer. To ensure that the geometry of the system matches the control calculations within the controlling computer system, the fixed ends of the rams are very precisely positioned relative to each other. To simplify the geometry and to provide for minimal obstruction around the pipe itself, the upper (fixed) ends of all the rams are located effectively in a common plane. It will be appreciated that this arrangement FIG. 5 shows in an exploded view the key components of the flange connection tooling within the inner frame 148 of FIG. 3. At the top of the figure is shown a slider beam assembly 154, with the Nut Running and Tensioning Tool 150 and Stud Loading/Unloading Tool (SLUT) 152 shown below. In the slider beam assembly 154, mountings 502 are provided for the rams 156, seen in FIG. 3. Assembly 154 provides a very rigid structure based on two circular beams 504 and 506, although a single I-beam might be sufficient. Mounted on these beams are a first linear carriage 508 and a second linear carriage 510. Carriage 508 includes an arcuate bearing 512 for the SLUT 152, and a mounting plate 514 for associated components. Carriage 510 similarly provides arcuate bearing 516 for the Nut Running and Tensioning Tool 150, and mounting plate 518 for associated components thereof.

SLUT 152 comprises a part-circular yolk formed by two parallel horseshoe-shaped members 540 and 542, rigidly connected together. Stud grippers 544 and 546 are mounted diametrically opposite one another, either side of the circular opening, where first pipe 100 will be located in operation. These grippers have a simply job mechanism suitable for holding a stud, as will be seen later. Also provided are two cameras 548, 550 with rams 549, 551 providing for their displacement in the axial direction, relative to the body of SLUT 152. By mounting in the arcuate bearing 512, and by hydraulic motors not shown, the entire SLUT 152 can be rotated around the pipe axis through an angle of substantially 180°. Accordingly, any of the hole positions on the first flange can be accessed by one or other of the grippers 544, 446.

Carriage 508 is driven longitudinally along the beams 504, 506 by means of a ram 520.

Similarly, a ram 522 drives the second carriage 510. By operation of ram 520, the stud grippers, cameras etc can be advanced or retracted parallel to the pipe axis.

Nut Running and Tensioning Tool 150 similarly comprises a part-circular yolk formed by two parallel geared plates 560 and 562. In this case, however, the yolk can be closed around a pipe by two hinged portions 564, 566. At eight positions around the circle, including positions on the hinged portions 564, 566, there is located a nut running and tensioning assembly. Each such assembly comprises a tensioner jack 568, tensioner collet 570 and a nut running socket 572, more easily seen in later figures.

In the embodiment shown, eight such assemblies are sufficient for only half of the bolts and nuts to be inserted. The tool 150 includes holes 574 and spaces 578 to permit the passage of intervening bolts. By rotating the assembly one sixteenth of a revolution about the pipe axis, the intervening bolts can be accessed by the same eight assemblies. In other embodiments, with a larger pitch circle and/or smaller operative parts, all positions be provided with their own nut runner and tensioner. Furthermore, in the present embodiment, these assemblies are mounted not directly on the two plates 560, 562, but on a separate template 580. This allows the apparatus to be adapted easily to different sizes of flange, using the nut runner and tensioner assemblies and the body parts 560, 562 in a different configuration.

Figure 6:
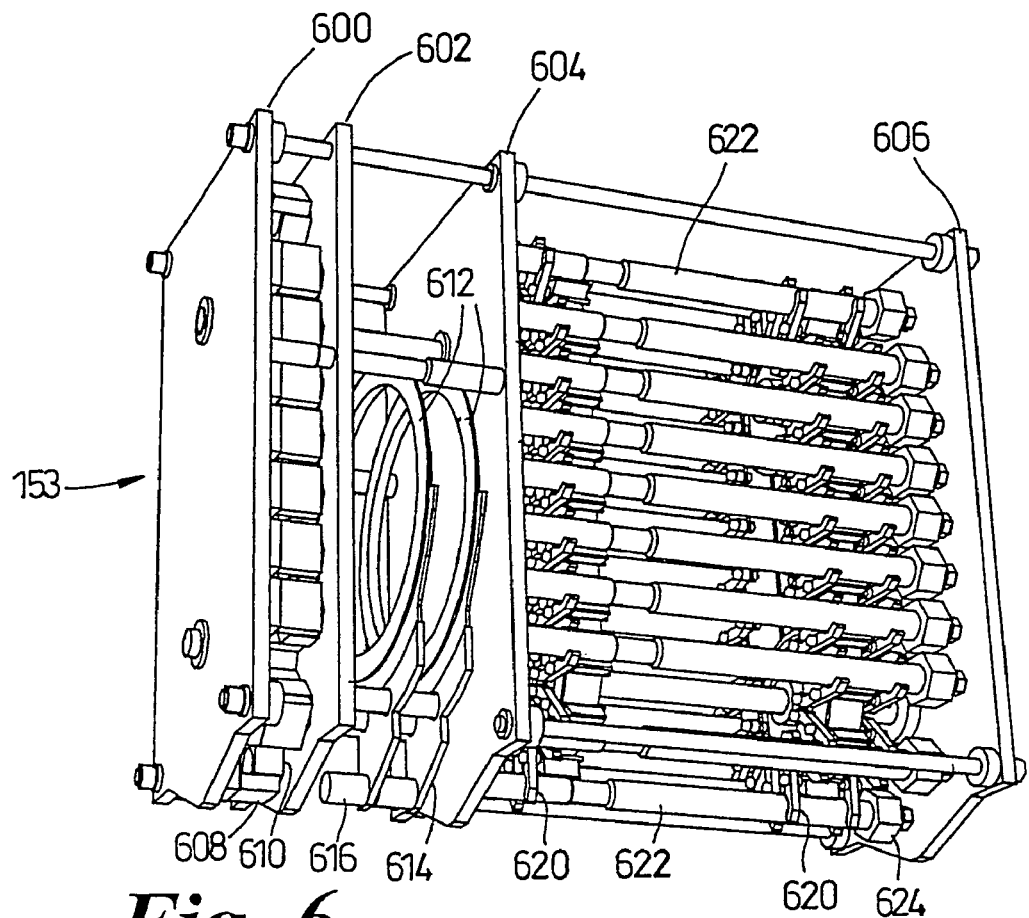
FIG. 6 shows in isolation a Consumable Carousel which acts as storage means for nuts, gaskets and studs, two such carousels being carried in the apparatus of FIGS. 1 to 3.

FIG. 6 shows in close up one of two Consumables Carousels 153, mounted in the inner frame 148. The carousel 153 is divided into sections by structural plates 600 to 606. Between 600 and 602, a first chain track movement with spring clips 608 carries up to twenty separately accessible nuts 610, any of which can be presented for transfer to the Nut Running and Tensioning Tool 150 under remote control. Between 602 and 604 a pair of gaskets 612 are stored. Each gasket is held within a slim cartridge plate 614, and each cartridge plate is provided with a projection 616 for handling the gasket by a transfer actuator (robot arm). Finally, between 604 and 606, a second chain track movement with spring clips 620 holds an array of up to twenty studs 622, pre-loaded at their rear ends with nuts 624.

Figure 7:
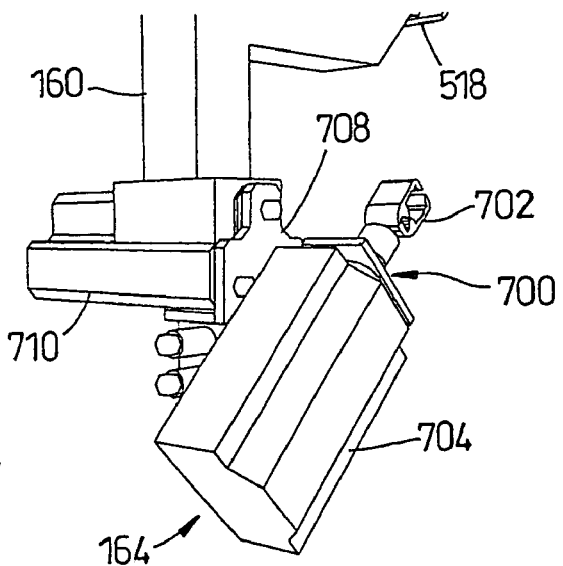
FIG. 7 shows in isolation one of four pick-and-place arms (PAPA), serving as transfer actuators for transfer of studs and nuts into the Flange Connection Tooling.

FIG. 7 shows in close up the Pick And Place loading Ann (PAPA) 164 (one of four similar actuators) of the flange connection apparatus 146. PAP 164 specifically is mounted on an arm 160 mounted to plate 518 on the carriage 510 (FIG. 5), so as to advance bodily with the Nut Running and Tensioning Tool 150. It comprises a hydraulically extendable arm 700 terminating in an openable gripper 702. The arm housing 704 in turn is mounted to a carriage 708 SO as to rotate on the carriage, providing the gripper 702 with two degrees of freedom in a radial plane. Carriage 708 is further displaceable in the axial direction relative to a second housing mounted on frame arm 160. These degrees of freedom allow the gripper 702 at the end of the actuator to reach up to the Consumable Carousel, extract a consumable (be it a stud or its respective nut) and position it at a desired location about the tooling. The reverse action is possible, whereby a nut or stud can be replaced in an empty compartment of the carousel, for example when dismantling a pre-existing bolted connection. PAPA can also be used for removing the flange cover (not shown) before remote bolted flange connection operations begin, and for inserting a gasket, as described further below.

By locating the consumables at a distance from the flanges it is possible to use the flange connection tooling to connect more than one pair of pipeline spool flanges. The system merely uses up the consumables until they are spent. The system of the present embodiment with a total of forty studs and forty nuts has the capacity to connect two flanges with up to twenty holes each. However, a person skilled in the art will understand that the number of flanges that can be connected by the system without having to bring it to the surface is not limited to this quantity, but is dictated by the combined capacity of the Consumable Carousels, and any facility for re-stocking the carousels without returning to the surface.

Connection Sequence

FIGS. 8 to 16 illustrate the sequence of major operations involved in making the bolted flange connection between pipes 22 and 30 of FIG. 1 using the apparatus just described. The connection system can be used for various different pipeline tie-in scenarios. In order to illustrate the overall methodology the sequence of events related to a remote spool piece tie-in is presented below. A similar sequence would be employed for other tie-in operations. The sequence assumes the closing spool metrology has been completed, and the fabrication of the spool completed. The connection system can be deployed from a standard dynamically positioned Diving Support Vessel (DSV), equipped with a suitable bottom reaching crane.

Figure 8A:
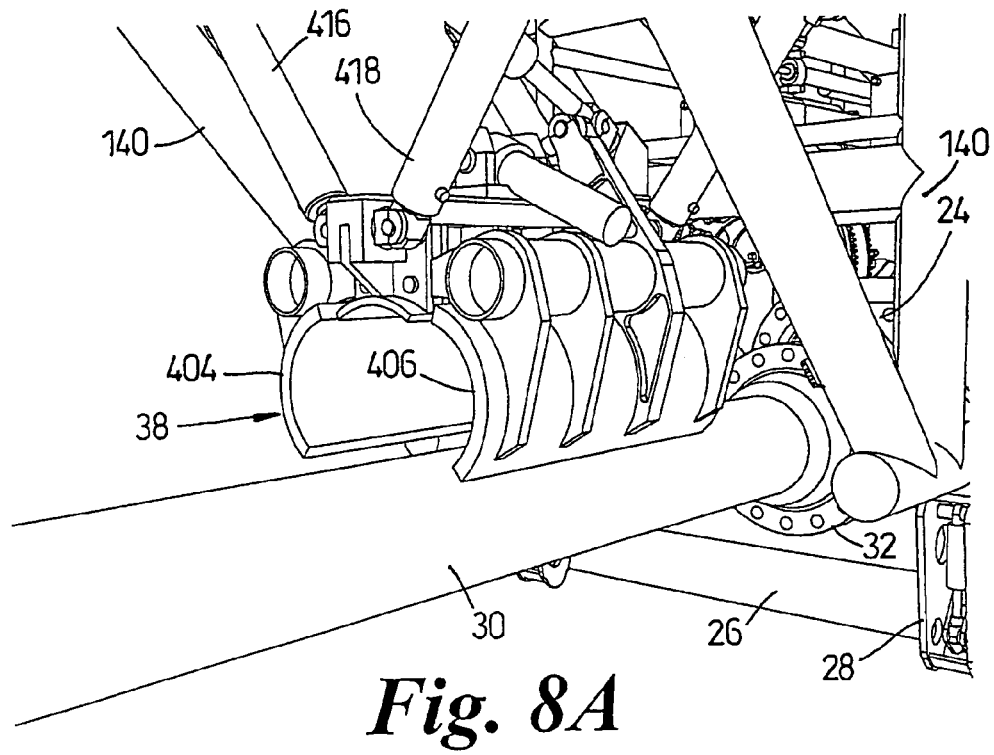
FIGS. 8A-8D illustrates steps in the initial capture and alignment of a pipeline spool piece using the Alignment Claw of FIG. 4.
Figure 8B:
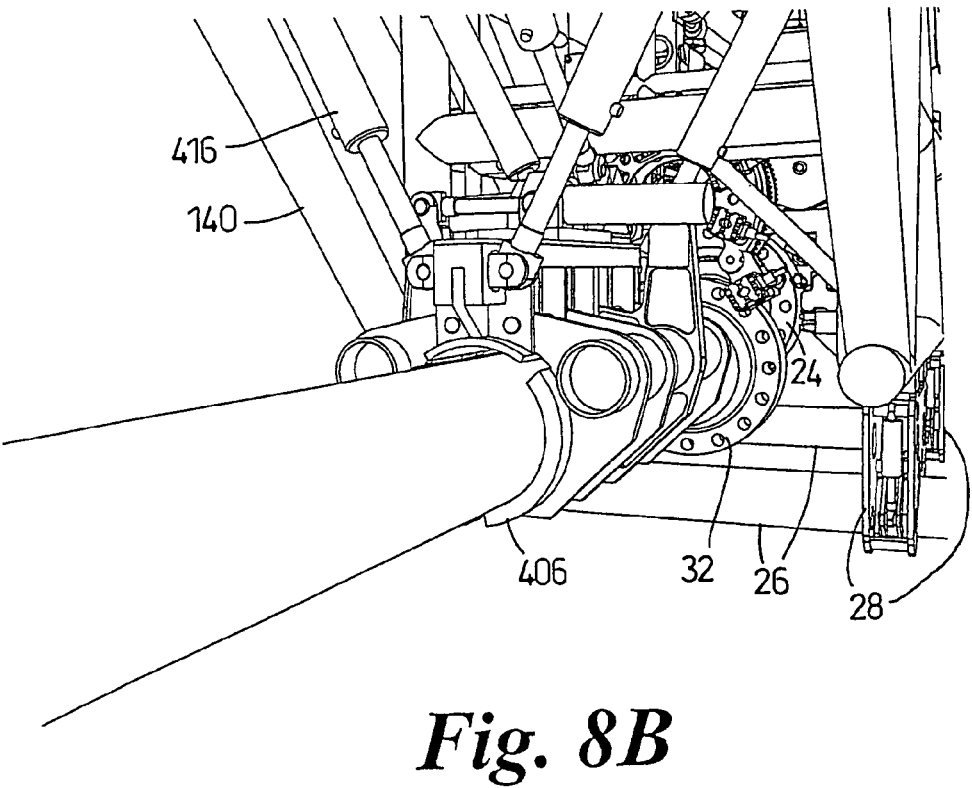
Figure 8C:
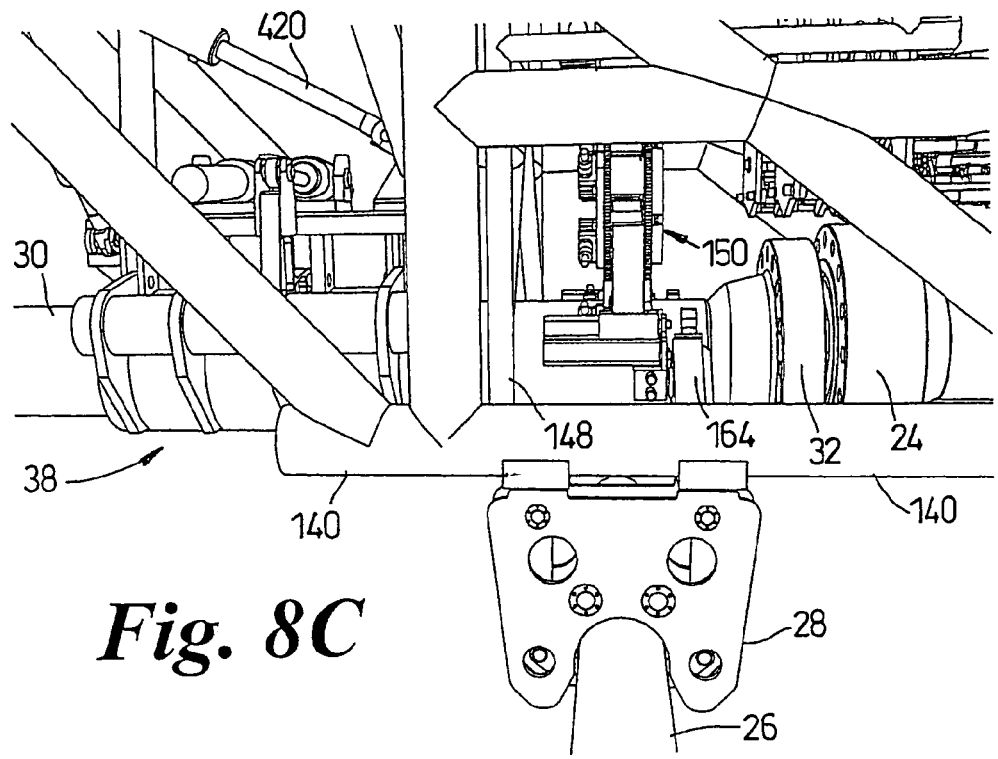
Figure 8D:
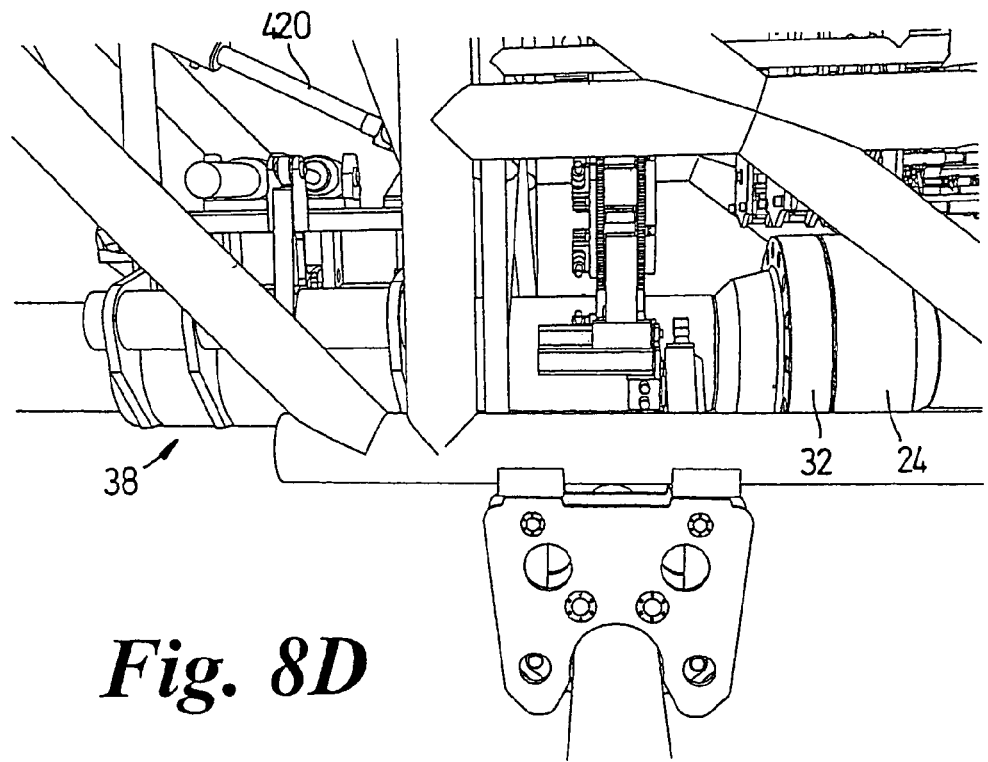

FIG. 8A shows Alignment Claw 38 being positioned over the movable pipeline spool 30. The "V" configured hydraulic rams 412 to 418 can be seen, in their fully contracted positions. Reaction claws 28 have engaged the docking bars 26 to secure the frame 140 and hence the entire apparatus at the work site. In FIG. 8B shows the Claw gripping the pipeline fully. One can see that the hydraulic rams have been extended, lowering the Claw 38 over the conduit, and the hinged jaws 404, 406 closed around it. Flange faces 24, 32, visible beneath the connection tooling 146, remain misaligned. FIG. 8C shows a side view of the equipment, again showing the axial misalignment between the two flanges. By selective use of the hydraulic rams the Alignment Claw can be aligned with respect to the frame, bringing the pipeline spools into mutual alignment (FIG. 8D). By adjusting the extension of the rams 412 to 418 and fifth ram 420 the Alignment Claw 38 is then used to back off the second flange 32 to a separation of approximately 100 mm, to allow a flange gasket to be inserted.

FIG. 9A to 9D show a gasket 612 being fitted between the two flanges 24, 32 by a Gasket Insertion Tool (GIT). FIGS. 9C and D show the gasket 612 and its cartridge 614 being grasped by PAPA 164 and swung from the carousel into alignment with a circular groove 616 in the face of pipe 22. In FIGS. 9C and 9D the mating half of pipeline spool 30/32 is not shown for clarity. Once the gasket is in place, the flange 32 is again advanced by alignment claw to trap the gasket in place, while permitting retraction of the slimmer cartridge 614.

Figure 10A:
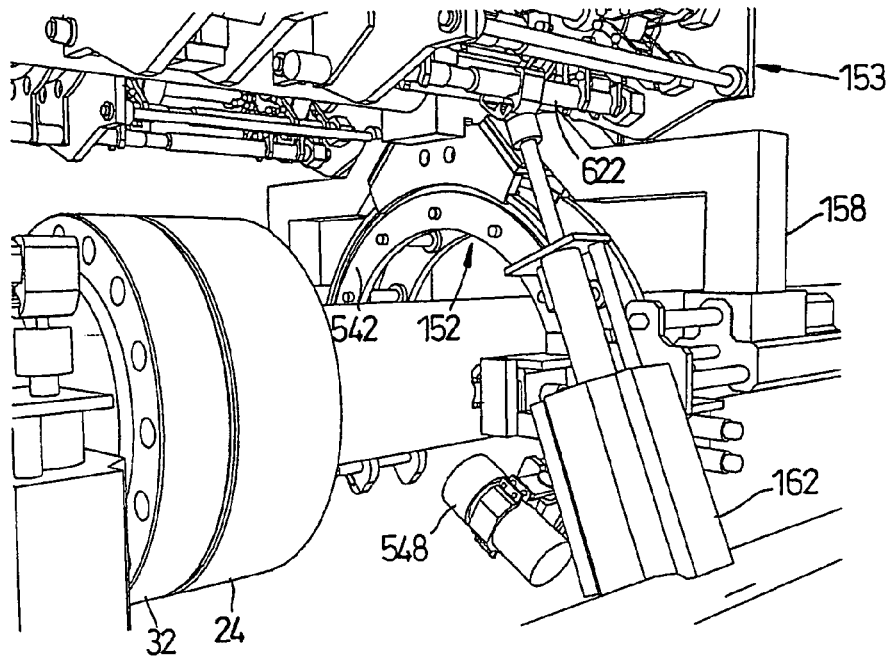
FIGS. 10A-10D illustrate the loading of studs into the Stud Loading/Unloading Tool of the apparatus using the PAPA of FIG. 7.
Figure 10B:
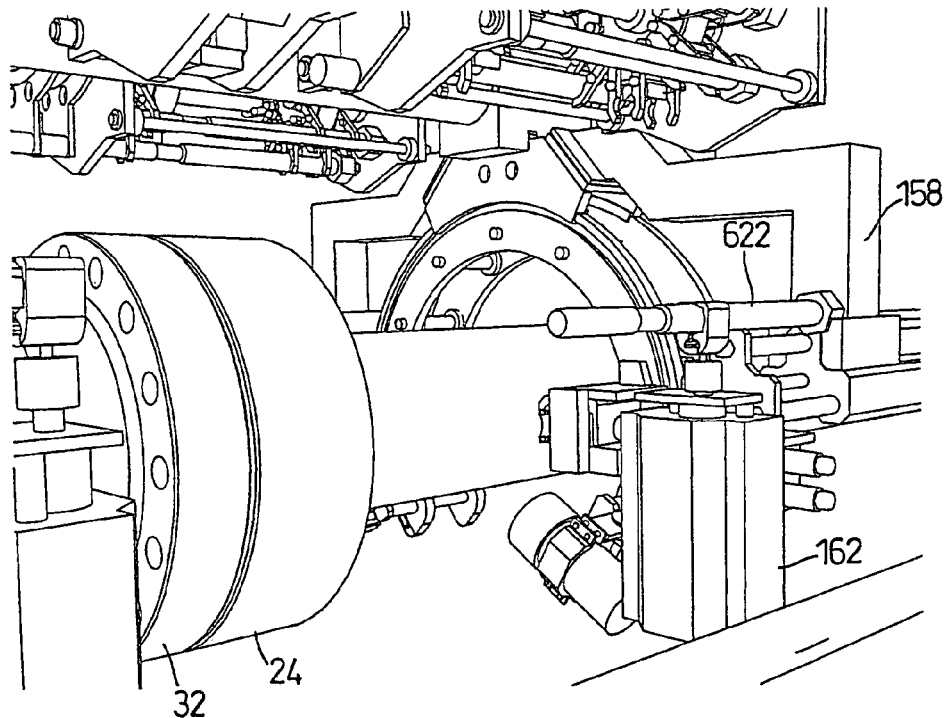
Figure 10C:
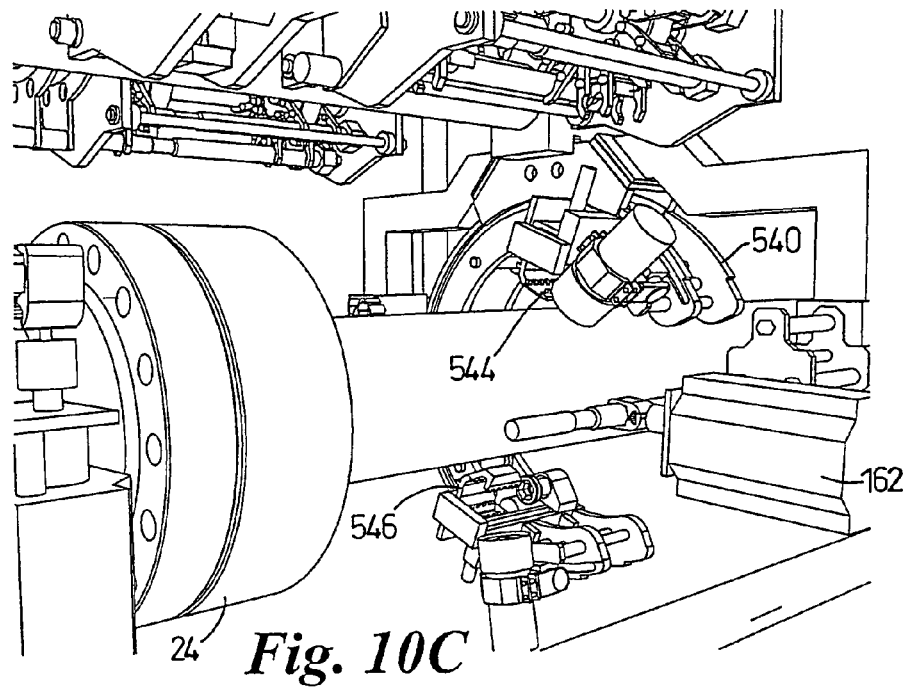
Figure 10D:
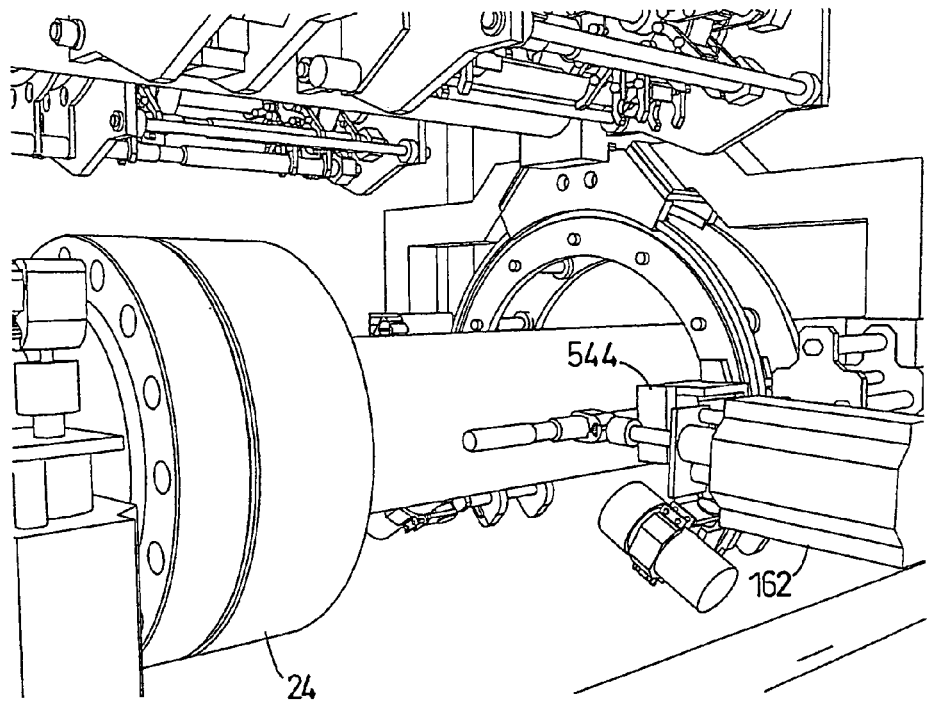

FIG. 10A shows PAPA 162 being used to remove a stud from the Consumable Carousel 153. The PAPA arm is rotated and extended to reach up into the Carousel and grip the stud 622 that has been previously moved into a registered collection position. FIGS. 10B, C and D shows the PAPA 162 placing the stud into the gripper 544 of the insertion actuator of the Stud Loading/Unloading Tool (SLUT) 152, the yoke (540/542) of which is rotated out of position (FIG. 10C) and back into position (FIG. 10D) to assist in this process. Gripper 544 closes and the PAPA gripper releases the stud and retreats. The same process is performed at the far side of SLUT 152 to load a stud from the other carousel into gripper 546.

Loaded with two studs in this manner, SLUT 152 can act as a flange alignment tool, probing the holes of the rotatable flange 24 with the two studs and rotating itself and the flange together, until a camera confirms that the two sets of holes are aligned. These axially directed cameras can be located on either the Nut Running and Tensioning Tool 150, for example in one of the intervening positions between the nut runners, or in SLUT 152.

FIG. 11A shows PAPA 164 removing a matching nut from a Consumable Carousel. FIGS. 11B and 11C shows nuts being placed into a sockets 572 on the Tensioning Tool 150, which sits in a load position back from the flange. Not illustrated in detail, it should be noted that each socket has an axially sprung sleeve for receiving the nut, which is torsionally keyed to a drive sleeve for rotation of the socket. By this means, if the socket is not aligned with the hexagonal nut, it can depress axially against the spring. The socket can then be rotated with very low torque until it is aligned with the nut, and the socket sleeve slides over the nut.

Every socket is filled with a nut, to match the profile of the studs on the other side of the flanges. Like the SLUT, the Tensioning Tool 150 can move axially along pipeline 140

(controlled by ram 522 of FIG. 5) and can screw tangentially to assist the PAPA in positioning the nut.

Figure 12A:
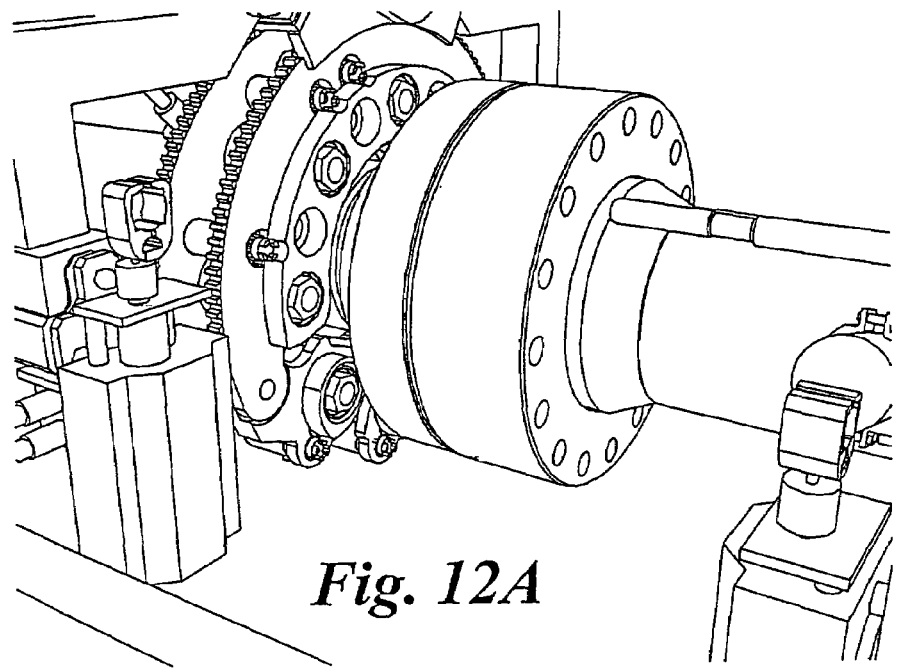
FIGS. 12A and 12B illustrate the insertion of studs to mate with the nuts at a first subset of hole positions.
Figure 12B:
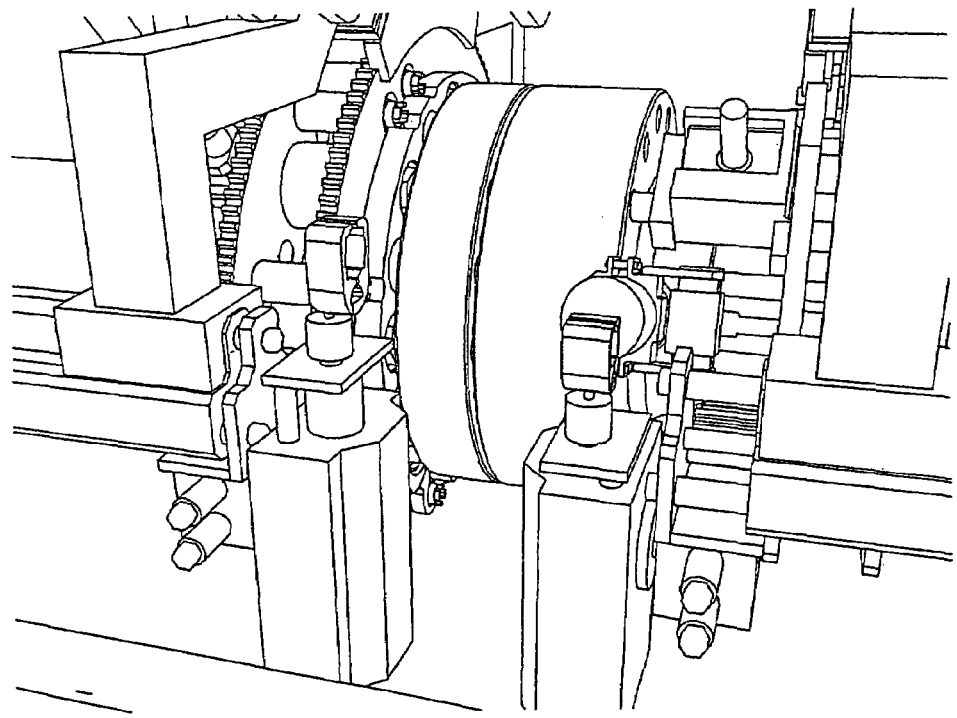

FIGS. 12A and B show the Tensioning Tool 150 being brought into position by longitudinal movement along the slider beam, to abut the flange face. The PAPAs are retracted prior to doing so. Also shown is one of a first pair of studs 622 being pushed through the flanges by advancing SLUT 152, to meet nuts held in the corresponding sockets the Tensioning tool 150. The process repeats until the first eight alternate locations are filled. The nuts are then run fully onto the studs by rotation of all eight sockets 572.

Figure 13:
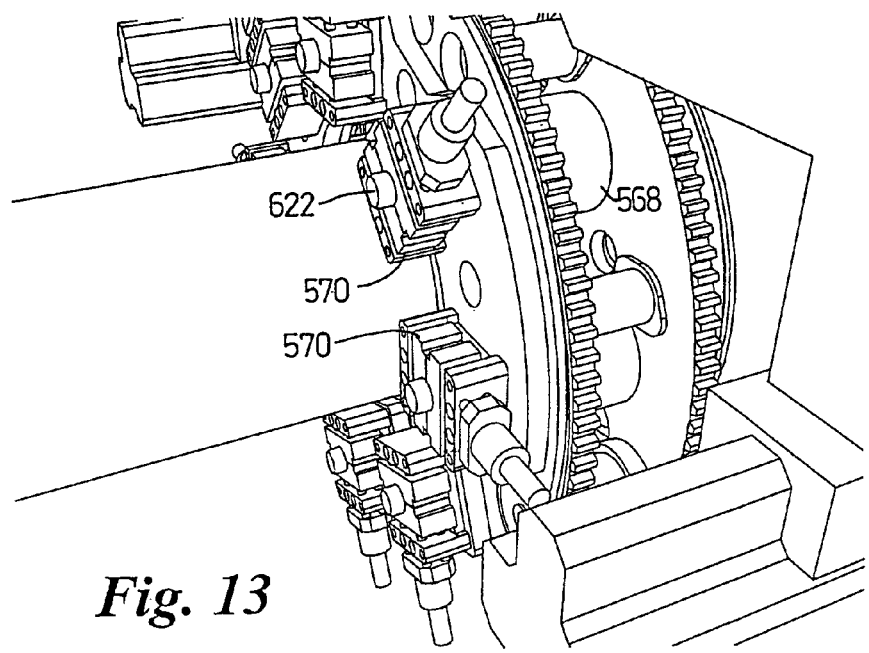
FIG. 13 illustrates the tensioning of the connection using the Nut Running and Tensioning Tool.

FIG. 13 shows the exposed threads of alternate studs as they protrude from the rear of the Tensioning Tool 150 and having passed through the loosely tightened nuts. Tensioner Collets 570 behind each socket 572 clamp the screw threads of the studs, and rams 568 apply a strong axial tension to compress the flange gasket and (slightly) stretch the studs 622 etc.

The studs and nuts are then loosely run together. The collets 570 and released, leaving eight bolts tightened with the desired axial tension. Alternate flange locations are now filled, leaving the remaining alternate locations.

Figure 14:
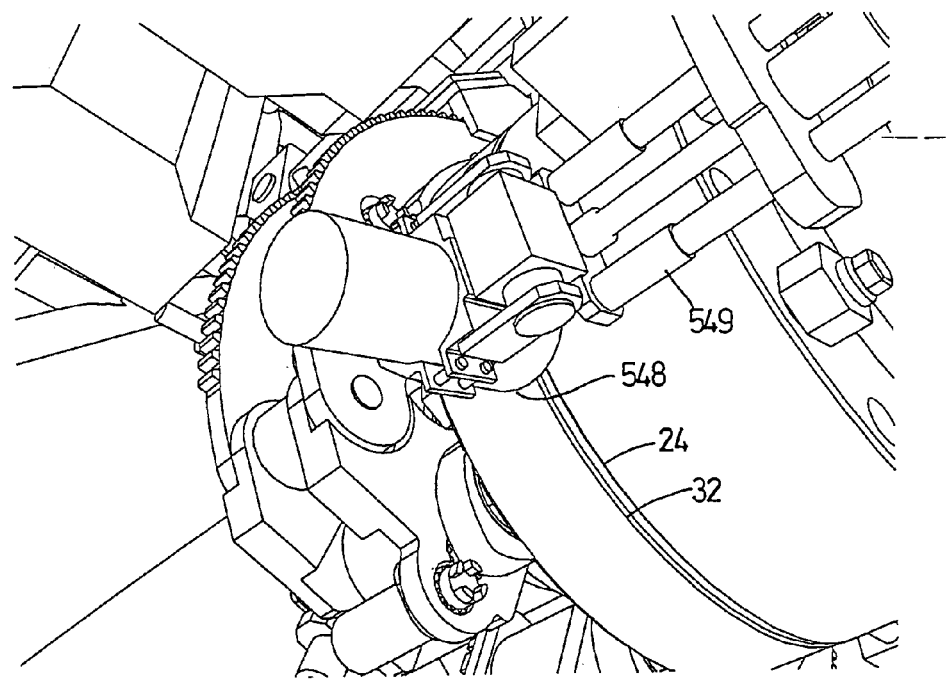
FIG. 14 illustrates visual inspection of the joint using a camera mounted on the stud insertion tool.

FIG. 14 shows camera 548 mounted on the SLUT performing a visual inspection of the inter-flange gap. Cameras 548 and 550 are moved axially by means of hydraulic actuators 549 and 551, as shown in FIG. 5. The cameras also move circumferentially by bodily rotation of SLUT 152 in its arcuate bearing 512, so as to inspect remotely the entire circumference.

Figure 15A:
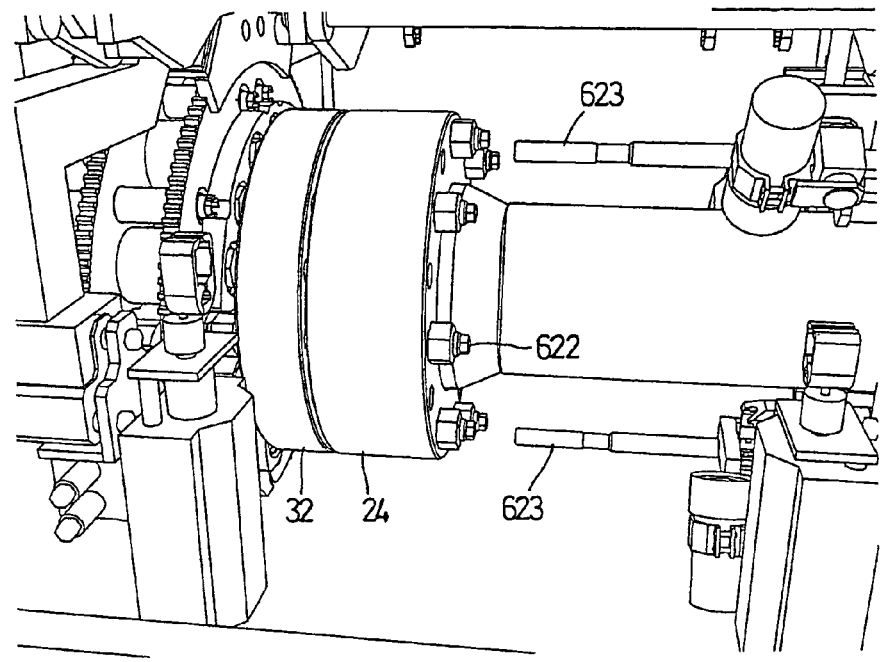
FIGS. 15A and 15B illustrate the insertion of studs at a second subset of hole positions.
Figure 15B:
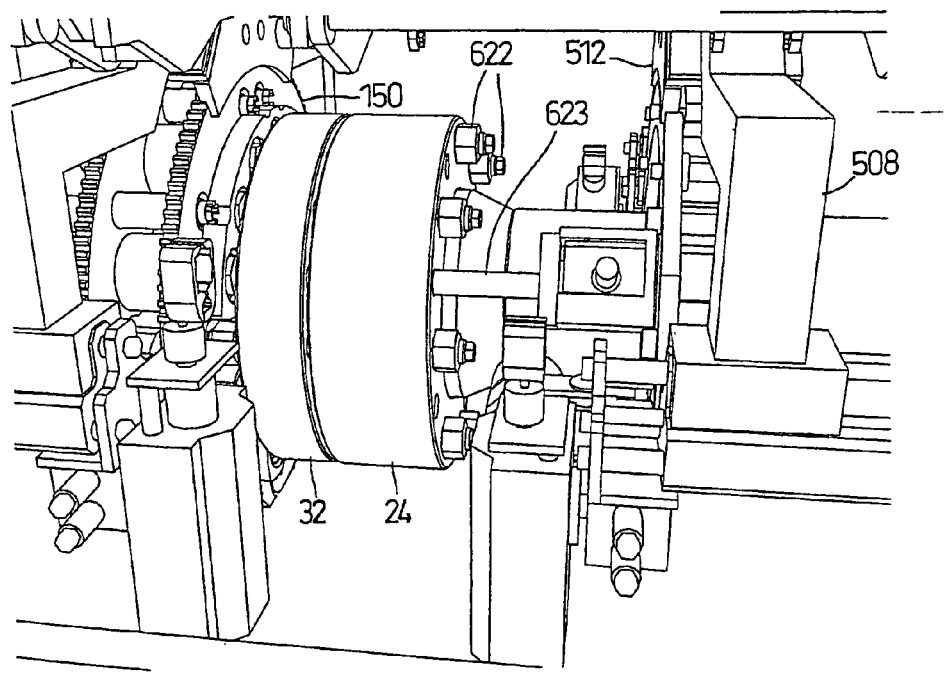

FIGS. 15A and B show the repeat operation for the remaining alternate studs 623, as they are rotated and brought into alignment with locations on the flange, then pushed in to locate with associated nuts held by the Tensioning Tool 150 on the other side. These second eight nuts have been loaded into sockets 572, while the body of Nut Running and Tensioning Tool 150 is rotated one sixteenth of a revolution, compared with its position in FIGS. 12A and 12B. As with the first set of studs 622 and nuts, the second set of studs 623 and nuts are loosely run together.

Figure 16:
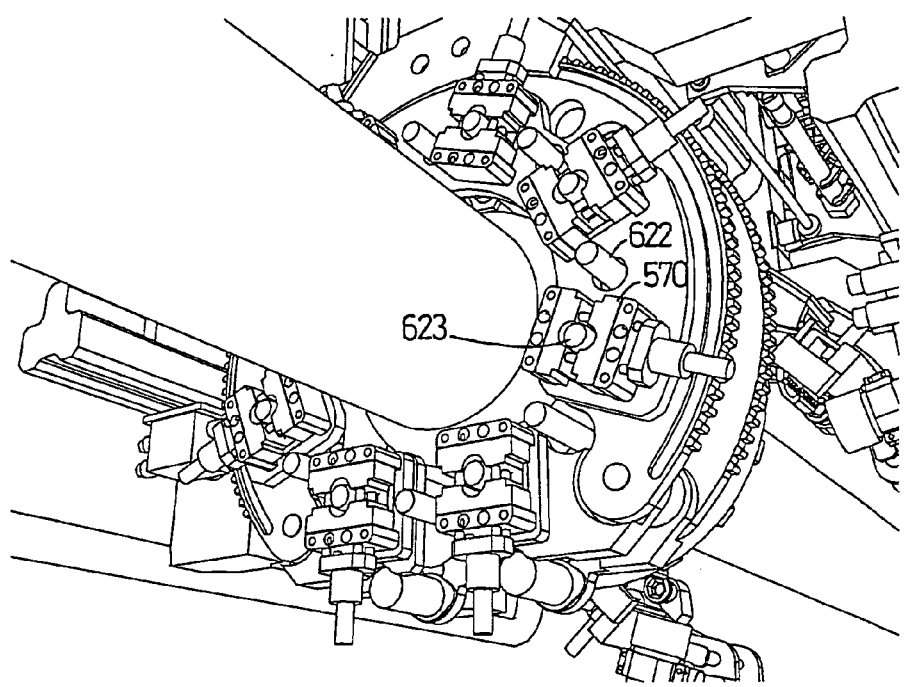
FIG. 16 illustrates completion of the tensioning, for the second subset of studs.

Finally, FIG. 16 shows all studs protruding from the Tensioning Tool 150, with the Tensioner Collets released having performed the final tensioning operation. Once all of the studs and their respective nuts have been installed, the correct tension has been applied to all of them and a final visual inspection has been made, the Flange Connection Tooling is removed from the Flange Alignment Frame and brought to the surface of the sea. The rest of the support equipment is then removed to clear the site. Alternatively, particularly while consumables remain in the carousels, the tooling can be moved to another work site and used to make another flange connection. Given the great sea depth above modern oil wells (1000 m-3000 m is envisaged), the ability to conduct several connections by a single unit, and without it returning to the surface is a major benefit.

Summarising the above procedure, and placing it in context, the following steps can be identified:

1. Remove the pipeline lay down head, by deploying the connection system together with the pipe handling frame to disconnect the flange.
2. Lower the spool piece to the seabed.
3. Position any necessary Pipe Handling frame (134 etc.) in a position 10 m back from the closing spool flange.
4. Pick up pipe with both pipe handling frames.
5. Install connection tooling 146 within the flange alignment frame 140 over the flanges.
6. Using the separate pipe handling frames if necessary, lift the pipes into the jaws 138 etc. of the Flange Alignment Frame, and align the flanges.
7. Separate the flanges 100 mm, insert a gasket, and close the flange.
8. Deploy (lower) the connection tooling 146 (150+152) inside the Flange Alignment Frame and connect the flange, the details of this procedure are:

Load pairs of bolts into SLUT 152, and move against the swivel flange 24.
   Close tensioner tooling around the pipe, and move against the weld neck flange 32.
   Angular align SLUT 152 with swivel flange 24.
   Insert bolts through swivel to start of weld neck flange 32.
   Angular align swivel/bolts with weld neck flange 32.
   Insert first bolts through the weld neck to the start of the tensioner tooling.
   Insert further bolts in pairs.
   Rotate the tensioner flange nuts to start the flange nut on the stud.
   Draw the stud through the flange nut until it finds the reaction nut.
   Start the reaction nut and with the flange nut, draw the stud through the flange unit the nut runners torque out.
   Tension the studs, and run the flange nuts up behind the flange.
   Repeat for intervening positions if necessary.
   Remove the tooling from the flange.
9. Disconnect the control umbilicals and remove the equipment from the pipeline. There is no installation equipment left attached to the pipeline.

Reversibility Features and Applications

As mentioned at various points above, the various actuators and modules of the novel apparatus are independently controllable and also reversible in their operations. Un-making pre-existing joints is one application, but all manner of interventions, particularly to resolve unplanned situations, are possible with the more flexible (yet more compact and self-contained) apparatus disclosed.

As a particular feature to this end, the axially sprung socket sleeves permit automatic engagement of the sockets 572 with a set of nuts on a pre-existing flange connection, as described in the introduction. A short advance and gentle rotation of all sockets simultaneously ensures that all sockets eventually find the correct rotational alignment for each nut. Driving with low torque (and of course low speed), each socket will find its orientation and stall against the nut. The sockets 572 can then be advanced fully onto the nuts, and full torque applied to them (together or one at a time) to unscrew the nuts, or adjust their tension.

The same property can be useful if the flange connection process illustrated in these drawings has to be interrupted for any reason.

Modifications

A person skilled in the art will understand that upon development of smaller hydraulic nut runners, tensioning units and collets it may be possible to locate the tooling in all locations, allowing the nuts and studs to be run-up and tensioned in a single operation, rather than for alternate locations.

This and other modifications are fully envisaged within the spirit and scope of the invention, defined more particularly in the appended claims.

What is claimed is:

1. A remotely controlled apparatus for use in forming a bolted connection between first and second flanges to connect the ends of respective first and second conduits in a subsea installation, each flange having a front face for meeting the other flange, a rear face and a set of holes at predetermined positions on a pitch circle, the apparatus comprising:

a stud loading tool for handling a set of studs corresponding in number to the holes in the flanges and arranged to approach from the rear of the first flange to insert a free end of each stud so as to project through aligned holes in the first and second flanges; and a nut running tool including at least one rotatable socket for holding at a nut behind the second flange to receive one of the projecting stud ends and for running the nut onto a threaded portion of the stud end, wherein said stud loading tool comprises:

at least one stud insertion actuator, adapted for gripping, inserting and releasing studs one at a time and supported so as to be movable to any of a plurality of hole positions within at least a segment of said pitch circle, and wherein the apparatus further comprises:

stud storage means for storing sufficient studs for the holes within said segment and operable to present the studs for removal one at a time;

stud transfer actuator for removing a stud from the stud storage means and transferring it to the stud insertion actuator for insertion at a desired hole position within said segment; and wherein the stud insertion actuator, the stud storage means and the stud transfer actuator are all supported on a common frame, the stud insertion actuator being moveable in a longitudinal direction relative to the common frame to perform said approach and insert the free end of the stud, the stud storage means being mounted on the common frame separately from the stud insertion actuator so as not to move longitudinally with the stud insertion actuator.

2. An apparatus as claimed in claim 1, wherein the stud transfer actuator comprises a gripping device mounted on a pick-and-place arm providing at least two translational degrees of freedom relative to said common frame and operable to grip and remove a stud presented by the stud storage means.

3. An apparatus as claimed in claim 1, wherein the insertion actuator is one of a set of insertion actuators, each associated with hole positions within a respective segment of the pitch circle, the set of such segments covering the complete circle.

4. An apparatus as claimed in claim 3, wherein the insertion actuators are carried on a common part-circular yoke open at one side to admit the first conduit and mounted in a part-circular bearing so as to be rotatable around the conduit through an angle at least equal to 360° divided by the number of insertion actuators.

5. An apparatus as claimed in claim 4, wherein the common yoke carries at least one camera for remote viewing of the flange connection in a radial direction.

6. An apparatus as claimed in claim 4 or 5, wherein at least one of the stud loading tool and the nut running tool carries at least one camera for remote viewing in an axial direction through the flange holes to confirm alignment and orientation of the first and second flanges.

7. An apparatus as claimed in claim 1, wherein the number of stud insertion actuators is two, each movable over substantially 180°.

8. An apparatus as claimed in claim 7, wherein the stud storage means comprises two separate magazines and a separate stud transfer actuator is provided for each stud insertion actuator.

9. An apparatus as claimed in claim 1, wherein the nut running tool defines a specific number of stud locations around said pitch circle, and said stud storage means can hold more studs than said specific number 10. An apparatus as claimed in claim 9, wherein said stud storage means can hold enough studs for completion of more than one flange connection having said specific number of studs.

11. An apparatus as claimed in claim 1, wherein said stud insertion tool is operable to engage a hole on the first flange using either a stud or equivalent body and, by rotating itself around the conduit axis, to rotate the first flange, thereby to align the holes in the first and second flanges.

12. An apparatus as claimed in claim 1, wherein said stud loading tool is carried on a first sub-frame and said nut running tool is carried on a second sub-frame, both sub-frames in turn being carried on said common frame for deployment as a single unit.

13. An apparatus as claimed in claim 12, wherein said common frame comprises an inner frame and an outer frame, the stud insertion tool, nut running tool, and stud storage means together being carried on the inner frame, the inner frame being separable from the outer frame, the outer frame comprising means for coupling the apparatus to support means at the worksite.

14. An apparatus as claimed in claim 12, wherein said stud transfer actuator is carried on said first sub-frame but not so as to rotate with the stud insertion actuator.

15. An apparatus as claimed in claim 12, wherein said common frame further carries at least one alignment claw operable to grip and manoeuvre one of said conduits into alignment with the other and with an axis of the stud loading tool.

16. An apparatus as claimed in claim 15, wherein said alignment claw comprises an openable elongate collar having forward and rear ends, said collar being suspended beneath part of said common frame by an arrangement of five independently controllable rams.

17. An apparatus as claimed in claim 15, wherein said common frame comprises inner and outer frames and said alignment claw is carried on said outer frame.

18. An apparatus as claimed in claim 15, wherein said common frame carries two alignment claws, one for each conduit.

19. An apparatus as claimed in claim 12, wherein said first and second sub-frames are mounted on a common sub-frame so as to be movable in unison relative to said common frame in a direction transverse to said conduits, and are movable independently of one another relative to the common sub-frame, in a direction parallel to the conduits.

20. An apparatus as claimed in claim 12, wherein said stud storage means comprises a magazine carried on said common frame independently of said first sub-frame.

21. An apparatus as claimed in claim 20 wherein said magazine further comprises storage for a plurality of nuts to be transferred to said nut running tool, the magazine being removable from the apparatus as a unit.

22. An apparatus as claimed in claim 21 wherein said magazine further comprises storage for at least one gasket to be transferred to a location between said flanges.

23. An apparatus as claimed in claim 12, wherein said apparatus further comprises buoyancy modules attached to the common frame so as to support substantially the entire mass of the apparatus in its operating environment.

24. An apparatus as claimed in claim 1, wherein said nut running tool comprises a plurality of rotatable sockets and further comprises:

nut storage means separate from the rotatable sockets for storing sufficient nuts for the holes within at least a segment of the pitch circle, and operable to present the nuts for removal one at a time; and at least one nut transfer actuator for removing a nut from the nut storage means and transferring it to one of said rotatable sockets for application to a stud at a desired hole position within said segment.

25. An apparatus as claimed in claim 24, wherein the nut transfer actuator comprises a gripping device mounted on a pick-and-place arm providing at least two translational degrees of freedom and operable to grip a portion of a nut presented by the nut storage means, such that another portion of the nut may be engaged within said rotatable socket.

26. An apparatus as claimed in claim 24, wherein the number of rotatable sockets is at least four, such that tension can be applied to the connection simultaneously in all quadrants of the pitch circle.

27. An apparatus as claimed in claim 26, wherein the number of rotatable sockets is half the number of holes.

28. An apparatus as claimed in claim 26, wherein at least a majority of the rotatable sockets are carried on a common part-circular yoke open at one side to admit the first conduit and mounted in a part-circular bearing so as to be rotatable around the conduit through an angle greater than 150°.

29. An apparatus as claimed in claim 26, wherein a minority of the rotatable sockets are mounted on one or more extensions of said common yoke, the extensions being pivotally connected to the common yoke and having a closed position placing the rotatable socket on said pitch circle and an open position for admitting the second conduit into the part-circular yoke.

30. An apparatus as claimed in claim 26, wherein each of said rotatable sockets is independently sprung against axial displacement and adapted to be driven at low torque so as to engage an array of nuts of unknown orientation.

31. An apparatus as claimed in claim 24, wherein two nut transfer actuators are provided in said nut running tool, and said nut storage means comprises a pair of nut storage magazines, one for each nut transfer actuator.

32. An apparatus as claimed in claim 1, wherein said stud storage means and said nut storage means comprise a magazine having receptacles for storage of nuts and studs independently, the magazine being removable from the apparatus as a unit.

33. An apparatus as claimed in claim 32, wherein said magazine has capacity for more than enough nuts and studs to complete said connection.

34. An apparatus as claimed in claim 32, wherein said magazine can hold enough nuts and studs for completion of at least two flange connections.

35. An apparatus as claimed in claim 1, wherein the apparatus further comprises axial tensioning means for engaging at least a subset of said studs and tensioning the studs longitudinally to compress the flange connection and permit further running of the nut by said rotatable socket.

36. An apparatus as claimed in claim 35, wherein said tensioning means comprises a collet and jack at the rear of each rotatable socket in the nut running tool.

37. An apparatus as claimed in claim 1, wherein the apparatus further comprises gasket storage means and wherein at least one of said stud transfer actuator(s) and said nut transfer actuator(s) is further operable to remove a gasket from the gasket storage means and to insert the gasket between the first and second flanges.

38. An apparatus as claimed in claim 37, wherein said gasket storage means is operable to store more gaskets than are required for completion of said connection.

39. An apparatus as claimed in claim 37 wherein said gasket storage means comprises a further section of a magazine housing said nut storage means and stud storage means.

40. An apparatus as claimed in claim 1, wherein at least one of said stud transfer actuator and said nut transfer actuator is further operable to remove a protective cover from the face of one said flanges prior to forming said connection.

41. An apparatus as claimed in claim 1, wherein when loaded with a set of studs and nuts has capacity more than sufficient for one bolted flange connection.

42. A method of operating an apparatus as claimed in claim 1 to make a new bolted flange connection near the seabed, the method further including reversing or repeating part of the connection process to accommodate random adverse events in the connection process.

43. A method as claimed in claim 42 further comprising re-stocking the apparatus with studs and/or nuts without returning the stud insertion tool or the nut running tool to the surface.

44. A method of operating an apparatus as claimed in claim 42, to un-make a pre-existing bolted flange connection.

45. A method of operating an apparatus as claimed in claim 1 to make a new bolted flange connection near the seabed, the method further including moving the apparatus and making a further bolted flange connection without re-stocking the storage means with studs or bolts.

* * * * *